(12) United States Patent
Pierce et al.

(10) Patent No.: US 6,508,482 B2
(45) Date of Patent: Jan. 21, 2003

(54) TRAILING ARM AXLE/SUSPENSION SYSTEM

(75) Inventors: Phillippi R. Pierce, Canton, OH (US); Mohamad A. Bachir, Medina, OH (US); Scott A. Dilling, Canton, OH (US); William L. McGrath, Alliance, OH (US); John E. Ramsey, Canton, OH (US); Joseph M. Ross, Canton, OH (US)

(73) Assignee: The Boler Company., Itasca, IL (US)

( * ) Notice: Subject to any disclaimer, the term of this patent is extended or adjusted under 35 U.S.C. 154(b) by 0 days.

(21) Appl. No.: 09/737,672

(22) Filed: Dec. 15, 2000

(65) Prior Publication Data

US 2001/0020775 A1 Sep. 13, 2001

Related U.S. Application Data

(63) Continuation-in-part of application No. 09/110,735, filed on Jul. 2, 1998, now abandoned.

(51) Int. Cl.⁷ .......................... B60G 9/02; B60G 11/26; B60G 11/46
(52) U.S. Cl. ......................... 280/124.116; 280/124.157; 280/124.163
(58) Field of Search .................. 280/124.116, 124.128, 280/124.132, 124.157, 124.1, 124.131, 124.163

(56) References Cited

U.S. PATENT DOCUMENTS

| | | | |
|---|---|---|---|
| 2,660,450 A | 11/1953 | Stigum et al. | |
| 3,482,854 A | * 12/1969 | Masser | 280/86.75 |
| 3,751,066 A | * 8/1973 | Narahari | 280/124.116 |
| 4,615,539 A | 10/1986 | Pierce | |
| 4,693,486 A | 9/1987 | Pierce et al. | |
| 4,858,949 A | 8/1989 | Wallace et al. | |
| 5,037,126 A | 8/1991 | Gottschalk et al. | |
| 5,039,124 A | 8/1991 | Widmer | |
| 5,112,078 A | 5/1992 | Galazin et al. | |
| 5,116,075 A | 5/1992 | Pierce | |
| 5,203,585 A | 4/1993 | Pierce | |
| 5,288,100 A | 2/1994 | Cherry et al. | |
| 5,328,159 A | 7/1994 | Kaufman et al. | |
| 5,366,237 A | 11/1994 | Dilling et al. | |
| 5,375,871 A | 12/1994 | Mitchell et al. | |
| 5,476,251 A | 12/1995 | Moses et al. | |
| 5,634,655 A | 6/1997 | Chalin | |
| 5,639,110 A | 6/1997 | Pierce et al. | |
| 5,649,719 A | 7/1997 | Wallace et al. | |
| 5,690,353 A | 11/1997 | Vandenberg | |

FOREIGN PATENT DOCUMENTS

| | | |
|---|---|---|
| DE | 296 15 286 | 11/1996 |
| EP | 0 240 649 | 10/1987 |
| EP | 0 625 440 A1 | 11/1994 |
| WO | WO 97/06022 | 2/1997 |
| WO | WO 97/42047 | 11/1997 |

\* cited by examiner

Primary Examiner—Peter C. English
(74) Attorney, Agent, or Firm—Buckingham, Doolittle & Burroughs, LLP; David P. Dureska

(57) ABSTRACT

A trailing arm axle/suspension system includes rigid or spring beams for mounting the axle directly to the beam without any or minimal, respectively, additional mounting hardware or structure. An axle mounting plate is formed as part of the preassembled rigid beam or attached to the spring beam, and is formed with a recess that can range from significantly smaller than to generally the same size as the smallest axle which will be seated therein. The axle is extruded into the recess to eliminate clearance and create intimate contact between the axle and the axle mounting plate. The force typically deforms the axle from its normal cross-sectional shape, such as round, into a generally oval or elliptical cross-sectional shape. Such clearance-free intimate contact also creates a constant preload or compression between the axle and the axle mounting plate in the recess area. Continuous welds; disposed in windows formed in the axle mounting plate, or, alternatively bolts, are circumferentially offset from recess-defining edges of the axle mounting plate and the vertical axis plane of the axle. The vertical height of the beam in the area of the axle mount, in rigid top mount beam applications, is relatively small to improve clearance in low ride-height applications, and an insert is disposed in this highly loaded area to strengthen the beam.

48 Claims, 19 Drawing Sheets

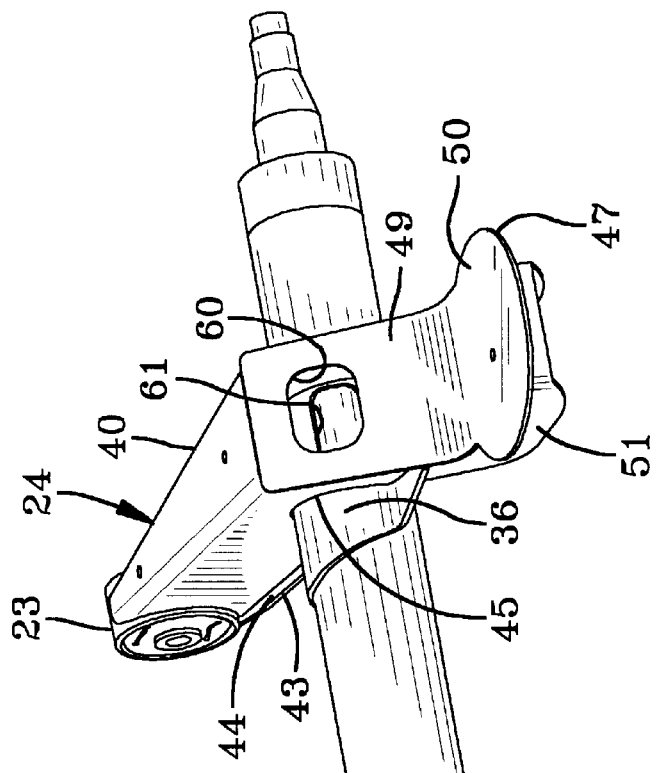
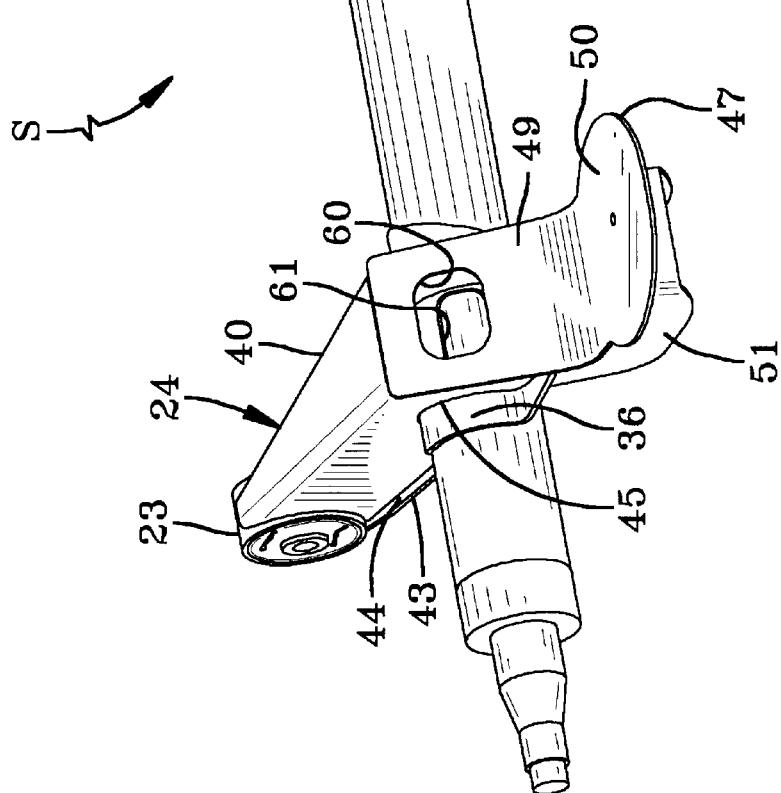
FIG-3

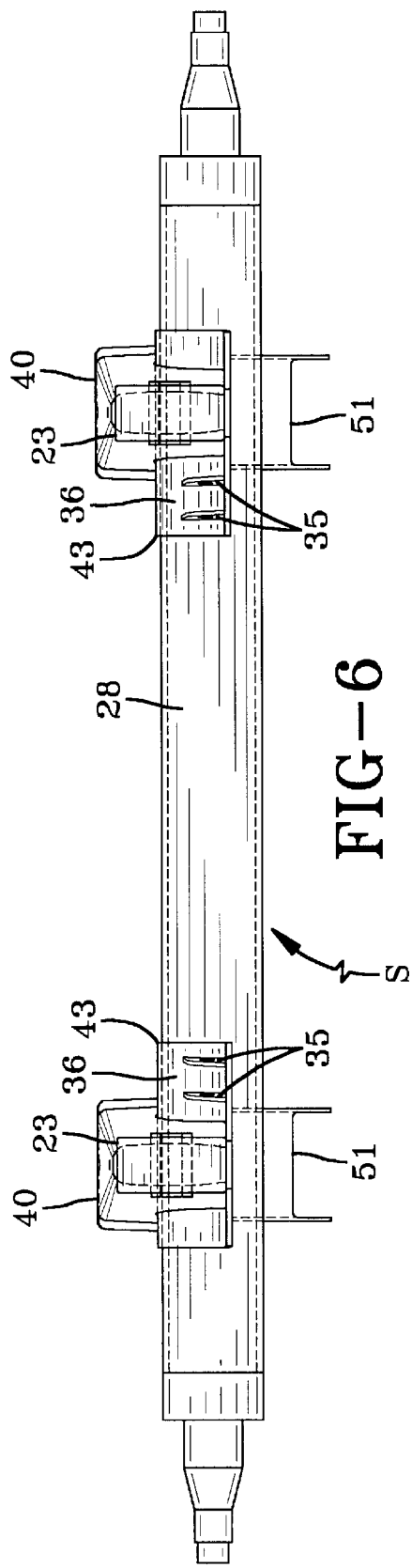
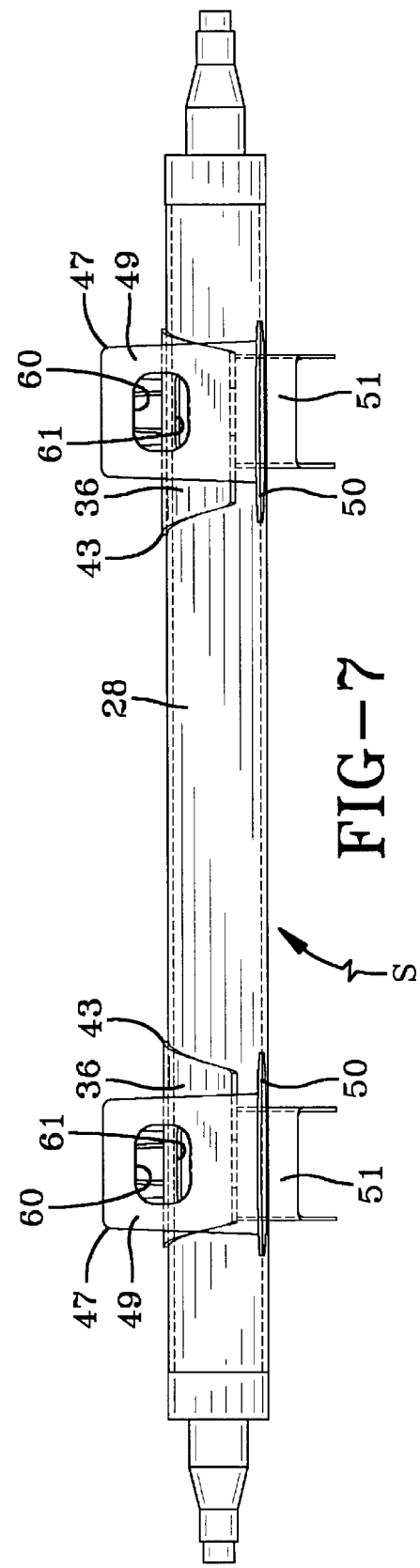

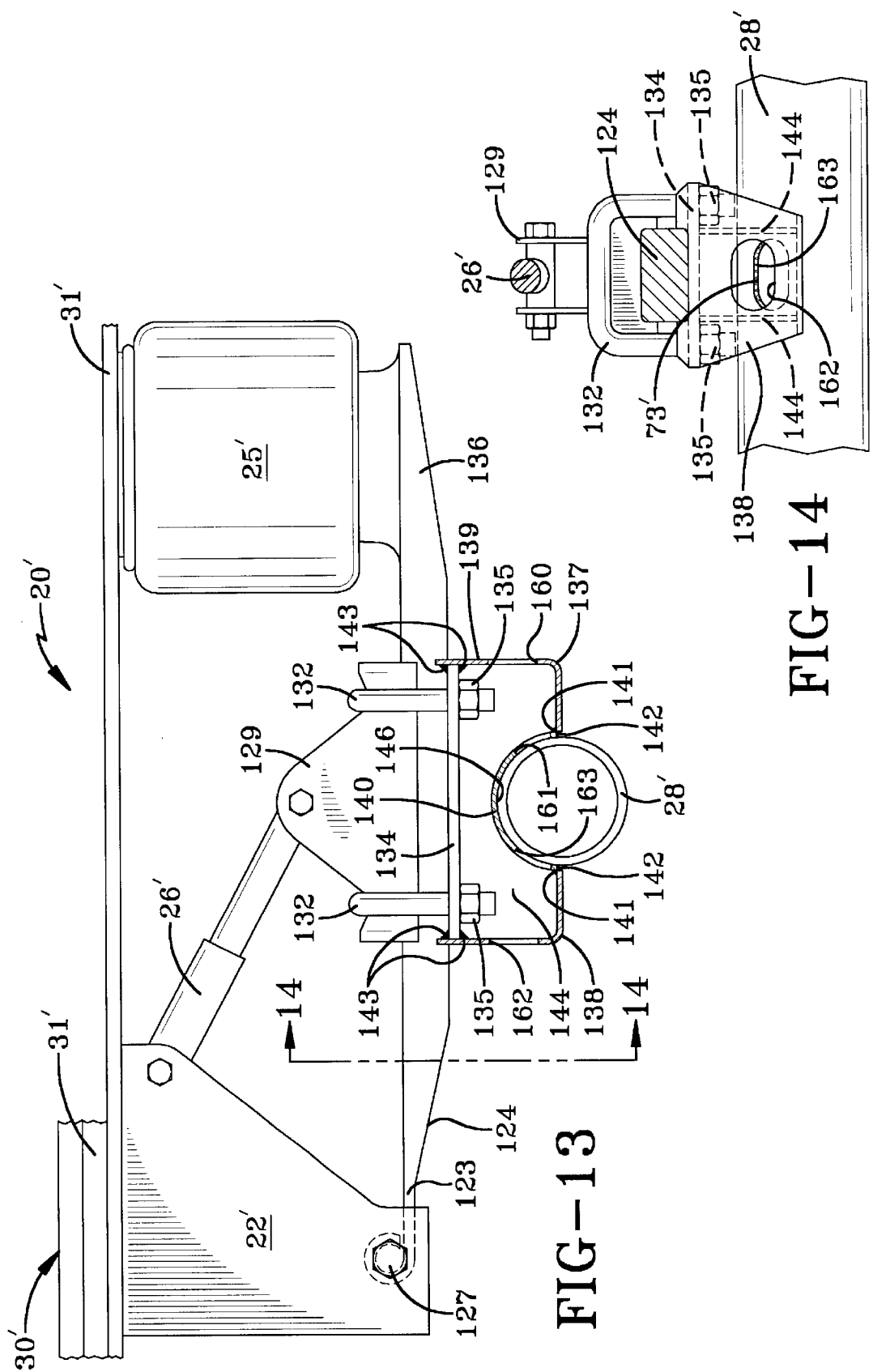

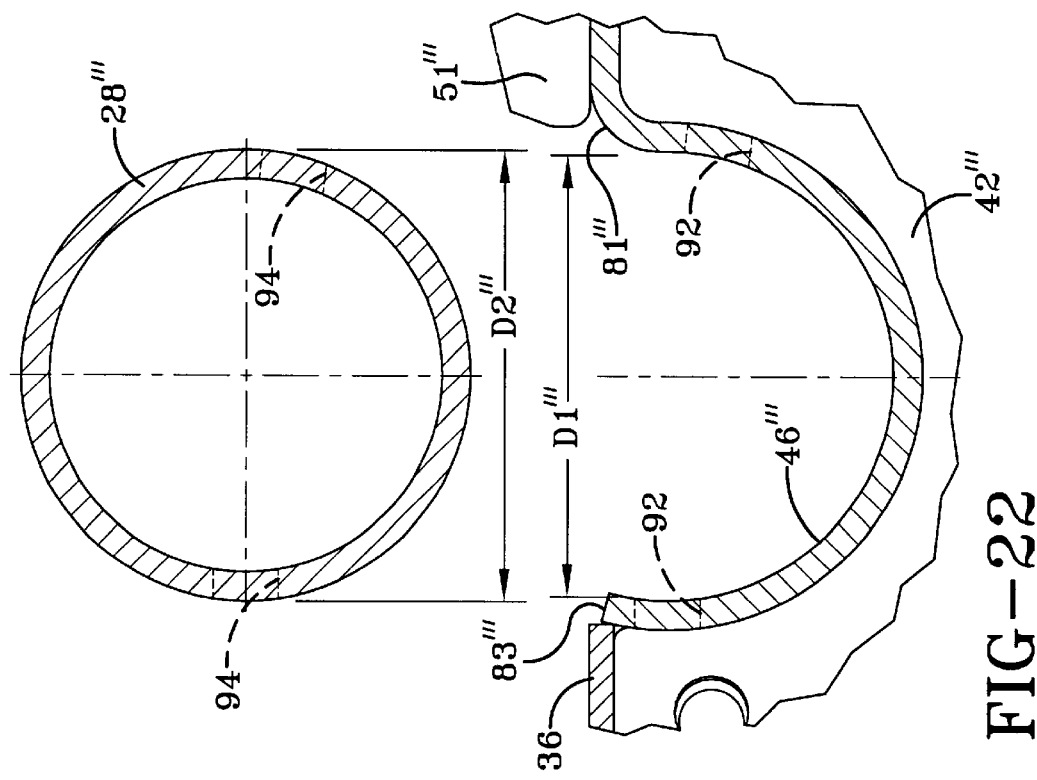
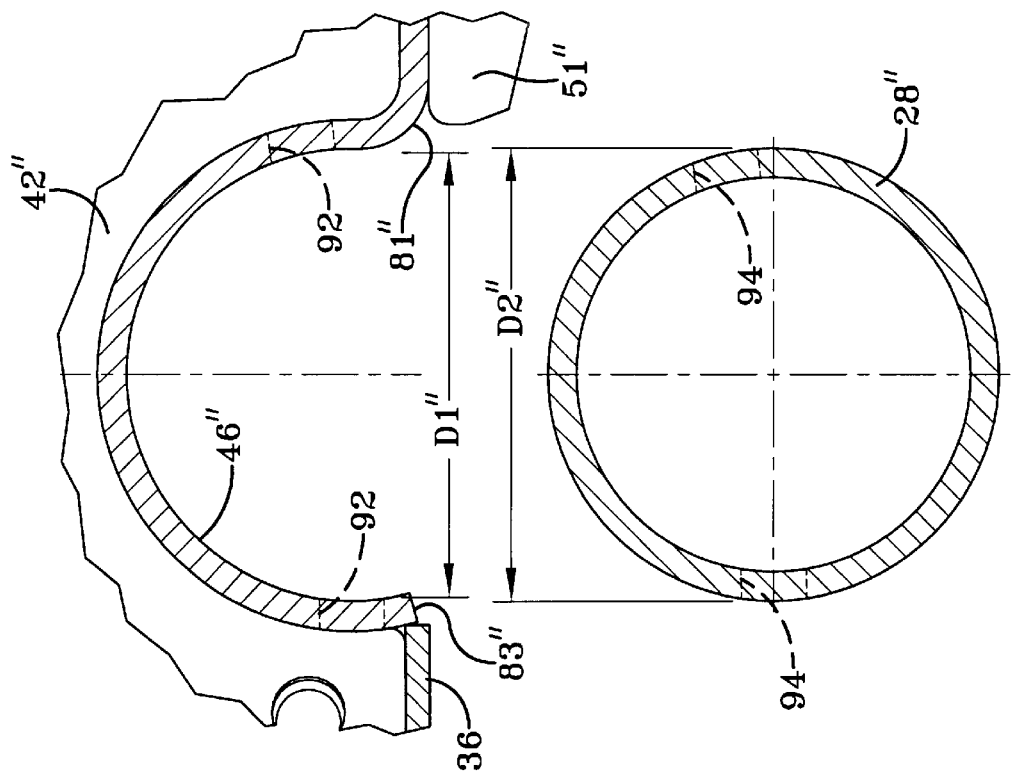

TRAILING ARM AXLE/SUSPENSION SYSTEM

CROSS-REFERENCE

This is a Continuation-in-Part of application Ser. No. 09/110,735, filed Jul. 2, 1998, now abandoned.

BACKGROUND OF THE INVENTION

1. Field of the Invention

The invention relates to axle/suspension systems for wheeled vehicles, and in particular to trailing arm rigid beam-type or spring beam-type axle/suspension systems for wheeled vehicles. More particularly, a first embodiment of the invention is directed to a trailing arm rigid beam-type axle/suspension system for trucks and tractor-trailers in which the axle is securely and efficiently mounted directly to the beams without any additional mounting hardware such as bolts, brackets and the like. A second embodiment of the invention is directed to a trailing arm spring beam-type axle/suspension system for trucks and tractor-trailers in which the axle is securely and efficiently mounted to the beams using minimal additional mounting hardware. A third embodiment of the invention is similar to the first embodiment, but uses bolts to assist in mounting the axle directly to the beams instead of welds, but still is free of additional hardware such as brackets and the like. All three embodiments of the present invention result in a lightweight, economical and sturdy axle/suspension system which limits fatigue stress on the axle/suspension system caused by various loads experienced by the vehicle during operation.

2. Background Art

The use of air-ride trailing arm rigid beam-type axle/suspension systems has become very popular in the heavy-duty truck and tractor-trailer industry. Air-ride trailing arm spring beam-type axle/suspension systems also are often used. Although such axle/suspension systems can be found in widely varying structural forms, in general their structure is similar in that each system typically includes a pair of longitudinally extending beams. Each beam is located adjacent to and below a respective one of a pair of spaced-apart longitudinally extending frame rails which depend from the trailer. More specifically, each beam is pivotally connected at one of its ends to a hanger which is attached to and depends from a respective one of the frame rails. An axle extends transversely between and typically is mounted on the beams anywhere from about the midpoint of each beam to the end of the beam opposite from its pivotal connection end. The opposite end of each beam also is connected to a bellows air spring or its equivalent which in turn is connected to a respective one of the trailer rails. A brake assembly and shock absorber typically also are mounted on each of the beams and/or axle. The beam may extend rearwardly or frontwardly relative to the front end of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of a vehicle.

The beam on which an axle is mounted typically either is a top mount or overslung beam or a bottom mount or underslung beam. An axle is mounted on the top of and is supported by the bottom mount or underslung beam-type, with generally the upper half of the axle being exposed. However, welding alone typically is inadequate to maintain the integrity of the axle to beam mount in underslung beams, since the predominant vertical axle loads placed on such beams are of the tensile rather than the compressive type. Inasmuch as welds tend to withstand compression better than tension, underslung axle to beam mounts must be fortified in some manner to maintain the mount integrity and prevent separation of the axle from the beams. Such fortification usually includes additional mounting hardware such as U-bolts, brackets and the like, resulting in a secure axle to beam mount more capable of withstanding tensile loads. However, such hardware adds unwanted cost and weight to an axle/suspension system. Examples of underslung axle/suspension systems which utilize significant additional axle to beam mounting hardware include U.S. Pat. No. 5,288,100 to Neway and 5,039,124 to Computer Design Chassis.

Conversely, an axle is mounted on the bottom of a top mount or overslung beam, with generally the lower half of the axle being exposed. The predominant vertical axle loads placed on top mount beams result in compression rather than tension. As noted immediately above, welds used to mount an axle to a beam withstand compression loads much better than tension loads. Thus, the majority of axle/suspension systems in commercial use today that are generally free of significant additional axle mounting hardware utilize top mount beams. Unfortunately, however, other forces such as torsional and fore-aft loads challenge the integrity of welds used as the sole means for mounting an axle to overslung beams, by causing tension in such welds. Therefore, many top mount axle/suspension systems also augment the axle to beam weld mounts with additional mounting hardware, but again sacrifice weight and cost efficiencies. Examples of overslung axle/suspension systems which utilize additional axle to beam mounting hardware can be seen in U.S. Pat. No. 4,693,486, 4,858,949 and 5,11 6,075, all of which are assigned to Lear Siegler, and U.S. Patent No. 5,328,159 assigned to Dana.

An example of a prior art axle/suspension system that has eliminated some of the additional hardware and utilizes only welds to secure the axle to a top mount beam can be found in U.S. Pat. No. 5,375,871 assigned to Ridewell. The upper portion of the axle is seated in a discrete shell member having a curved configuration which is complementary to the curvature of the axle, and elongated welds which extend generally adjacent to the lower ends of the shell are used to secure the axle to the shell. Although such an arrangement secures the axle to the beam, during operation of the vehicle the beam is subjected to various types of loads as discussed hereinabove, some of which can result in fatigue stress and cause cracking at the toes of the horizontal welds as well as in the axle itself. More specifically, torsional loads caused by trailer or suspension roll are transmitted through the bottom plate of the beam to the axle via the horizontal welds, thus creating stress concentration areas adjacent to the weld toes. Moreover, longitudinal or fore-aft loads created by movement of the axle/suspension system through a generally vertical arc during normal operation of the vehicle, which arc includes a longitudinal component, also adversely affect the aforementioned horizontal welds. Vertical and lateral loads also contribute to this problem. The relatively loose seating of the axle in the shell, whereby areas of clearance exist between the outer surface of the upper portion of the axle and the lower surface of the shell, intensifies the stress placed on the welds by the various loads. More particularly, especially during conditions of trailer lean which causes the aforementioned torsional loads, the horizontal welds are subjected to a cycling range of tensile and compressive loads, and areas of clearance between the axle and beam mount widen this cycling range thus placing increased stress on the welds. U.S. Pat. No. 2,660,450 assigned to Pointer-Willamette; 4,615,539 to Lear Siegler; 5,112,078 to Neway; and 5,634,655 to Watson & Chalin Manufacturing, all disclose arrangements similar to that shown in the '871 patent to Ridewell.

Examples of bottom mount axle/suspension systems, which similarly attempt to mount the axle to the suspension beams using only welds, can be seen in the '871 patent to Ridewell and the '655 patent to Watson & Chalin discussed hereinabove.

A first embodiment of the present invention solves the problem of securing an axle to either top mount or bottom mount rigid suspension beams without the addition of any costly additional support parts and labor to assemble those parts, which also add unwanted weight to the suspension assembly. A second embodiment of the present invention provides a solution to mounting an axle on either top mount or bottom mount spring suspension beams using minimal additional mounting hardware. A third embodiment is similar to the first embodiment, but utilizes bolts to assist in securing the axle to the beams instead of welds.

These problems have been solved by the present invention through the use of a pre-assembled rigid or spring beam having an axle mounting plate formed with a recess which can range from significantly smaller than to generally the same size as the smallest axle which will be seated therein, and by seating the axle in the recess under force sufficient to deform a round axle into a generally oval or elliptical shape at the area of axle mounting to the beam. Such a tight fit eliminates, clearance and creates intimate contact between the axle and the axle mounting plate of the beam so that a preload or compression occurs at the interface between the outer surface of the axle and the axle contacting surface of the axle mounting plate. This intimate contact strengthens the axle against loads and resulting stresses encountered during operation of the vehicle and eliminates the need for an unusually robust beam and significant accessory hardware for supporting the axle. More specifically, this preload, which can also be described as a constant or continuous load exerted on the axle by the axle mounting plate, maintains the welds, or other fastening means such as bolts used to assist in securing the axle to the beam, in compression rather than tension. Other features of the present invention which contribute to solving problems encountered with prior art overslung and underslung trailing arm axle mounts such as described hereinabove, include the utilization of continuous welds disposed in windows formed in the axle mounting plate of the beam and which are circumferentially offset from the interface of the ends of the axle mounting plate and the axle. Alternatively, huck bolts, rivets or other fastening means can be used instead of welds in the same location. This strategic placement of the welds or bolts, in combination with the preload placed on the axle by the axle mounting plate, especially adjacent to the welds or bolts, effectively prevents stresses from damaging the fastening means of the axle by preventing loads from being transferred from the beams directly through the welds or bolts and into the axle. In the case of top mount rigid beams, another feature of the present invention is a decrease in the vertical distance from the top of the mounted axle to the top plate of the beam over that found in many prior art top mount rigid beams, in order to reduce clearance problems between the beam and the bottom of the trailer frame such as in low ride-height applications. The lack of material in the beam in the axle mount area caused by this decrease is compensated for with an insert contained within the beam adjacent to the axle mount area, and which is welded to the beam utilizing a single weld, consisting of one or more passes, which also welds beam sidewalls to the beam axle mounting plate.

SUMMARY OF INVENTION

Objectives of the present invention include providing a trailing arm axle/suspension system for wheeled vehicles, in which the axle is securely mounted to the suspension beams without the use of any additional parts or structure or alternatively using only minimal additional parts or structure.

Another objective of the present invention is to provide such a trailing arm axle/suspension system which can be assembled using as few as or fewer steps than assembly methods for prior art trailing arm systems.

A further objective of the present invention is to provide such a trailing arm axle/suspension system which is lighter and more cost effective than prior art trailing arm axle/suspension systems.

Still another objective of the present invention is to provide a trailing arm, top mount rigid beam-type axle/suspension system, which provides improved clearance between the beam and the vehicle frame in the axle mount area.

These objectives and advantages are obtained by a vehicle axle/suspension assembly, the general nature of which may be stated as including at least one suspension beam mounted on a frame of the vehicle, the suspension beam comprising an axle mounting plate formed with a recess, the recess having a shape generally complementary to and surrounding about half of the periphery of an axle, the axle mounting plate having a pair of edges defining the outermost limit of the recess, the recess being sized in the range of significantly smaller than to generally the same size as the surrounded axle periphery prior to mounting the axle on the axle mounting plate, and fastening means being circumferentially offset from the recess edges and a vertical axis plane of the axle, for securing the axle mounting plate to the axle.

BRIEF DESCRIPTION OF THE DRAWINGS

The preferred embodiments of the invention, illustrative of the best mode in which applicants have contemplated applying the principles, is set forth in the following description and is shown in the drawings and is particularly and distinctly pointed out and set forth in the appended claims.

FIG. 3 is a rear perspective view of the portions of the axle/suspension system shown in FIG. 2;

FIG. 6 is a front elevational view of the portions of the axle/suspension system shown in FIGS. 2 through 5, with hidden parts represented by broken lines;

FIG. 7 is a rear elevational view of the portions of the axle/suspension system shown in FIGS. 2 through 6, with hidden parts represented by broken lines;

FIG. 13 is a fragmentary outboard side elevational view of a second embodiment of the trailing arm axle/suspension system of the present invention, wherein the arm of the suspension assembly is a top mount spring beam, and hidden parts are represented by broken lines;

FIG. 14 is a fragmentary sectional view taken along lines 14—14 of FIG. 13, with hidden parts represented by broken lines;

FIG. 20 is a greatly enlarged fragmentary side view of one of the beams and an axle represented in cross-section, illustrating one example of the relative diameters of an axle and the axle recess formed in the axle mounting plate, just prior to insertion of the axle in the recess;

FIG. 22 is a view similar to FIG. 20, but showing a bottom mount beam and an axle just prior to insertion of the axle in the axle recess.

Similar numerals refer to similar parts throughout the drawings.

DESCRIPTION OF THE PREFERRED EMBODIMENTS

Figure 1:
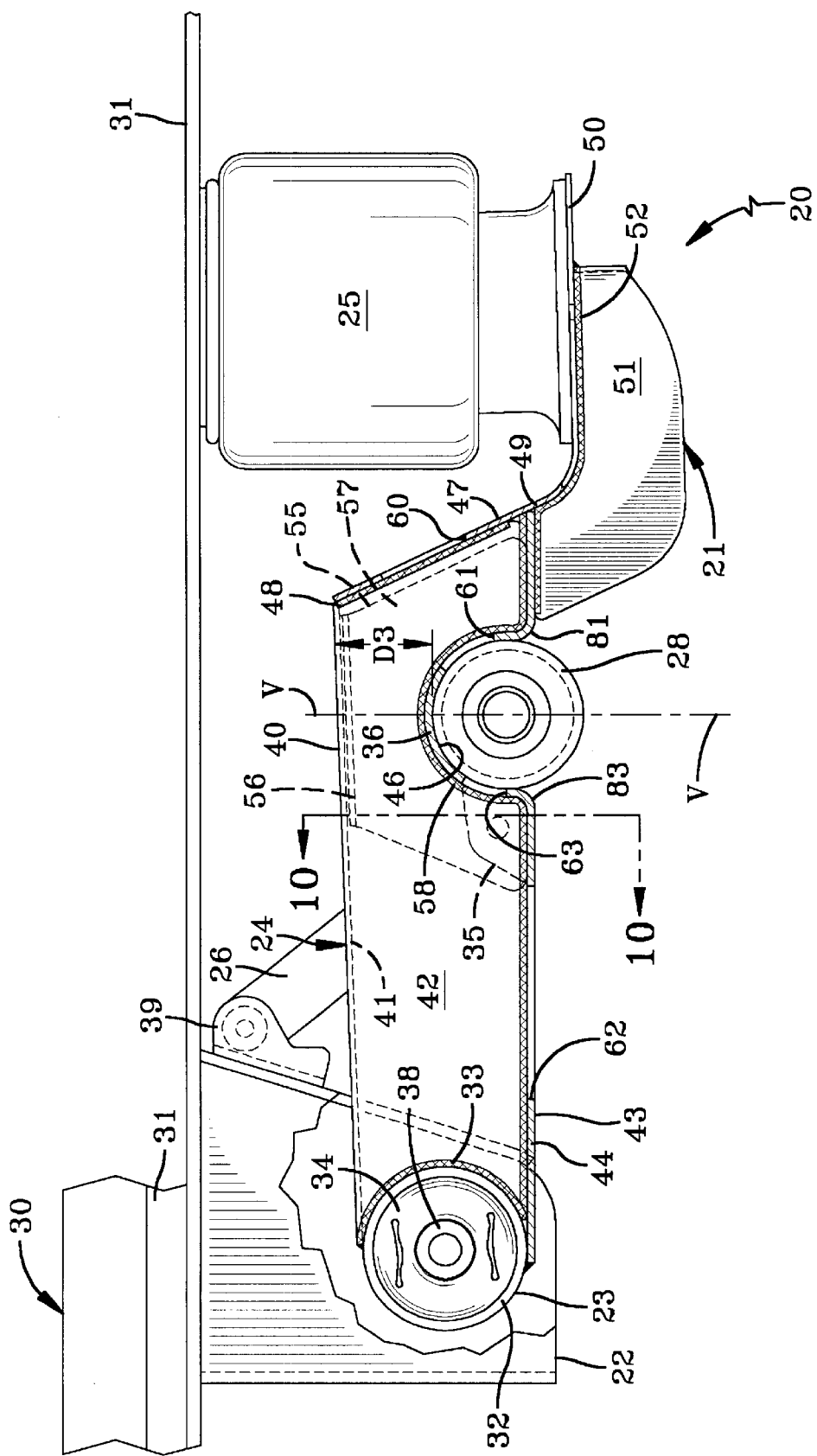
FIG. 1. is a partially sectioned fragmentary outboard side elevational view of a first embodiment of the trailing arm axle/suspension system of the present invention, wherein the arm of the suspension assembly is a top mount or overslung rigid beam, and hidden parts are represented by broken lines.

The first embodiment of the present invention is an air-ride trailing arm rigid beam-type axle/suspension system for a tractor-trailer, and is indicated generally at 20 and is shown in FIG. 1. A vehicle frame 30 supports one or more axle/suspension systems 20. It is understood that vehicle frame 30 can be the frame of a trailer of a tractor-trailer, or the frame of any other wheeled vehicle such as a heavy truck or the like, without affecting the concept of the present invention. Inasmuch as axle/suspension system 20 includes generally identical suspension assemblies 21 each suspended from a respective one of a pair of hangers 22 and vehicle frame 30, only one of the suspension assemblies will be described in detail herein. Hanger 22 is, by any suitable means such as welding, securely mounted on and depends from a respective one of a pair of spaced apart, parallel, longitudinally extending elongated frame rails 31 which are secured to and depend from the underside of vehicle frame 30 of the trailer of a semi-trailer (not shown). A bushing assembly 23 is rigidly attached to the front end of a trailing arm rigid beam 24. More specifically, bushing assembly 23 includes a beam mounting tube 32, which is welded to the front end of beam 24 by weld 33. A pivot bushing 34 is press-fitted into tube 32 in a manner well known to the art and to the literature. Rubber pivot bushing 34 surrounds and is adhered by any suitable means to a metal sleeve 38. Metal sleeve 38 in turn is pivotally mounted (not shown) on hanger 22. It should again be noted that the direction of extension of beam 24 rearwardly or frontwardly from its pivot attachment to hanger 22 defines a trailing or leading arm beam, respectively, and both trailing and leading arm beams can be used in the present invention without affecting its overall concept. However, as mentioned hereinabove, for the sake of convenience the term trailing arm when used herein shall encompass both trailing arm and leading arm beams. An air spring 25 is suitably mounted on and extends between the upper surface of the rear end of beam 24 and frame rail 31. A shock absorber 26 extends between and is mounted by suitable means on brackets 35 and 39 which are in turn each suitably attached to beam 24 and hanger 22, respectively. An axle 28, having a generally round cross-sectional shape, extends between and is captured in the pair of beams 24 of axle/suspension system 20. One or more wheels (not shown) are mounted on each end of axle 28.

In accordance with one of the key features of the present invention, rigid beam 24 preferably is preassembled prior to its incorporation into suspension assembly 21. However, it is understood that beam 24 can be incorporated into suspension assembly 21 without preassembly of the beam, and the concept of the present invention will be unaffected. More particularly, beam 24 preferably is formed of a sturdy metal such as steel and includes a one-piece integrally formed inverted U-shaped top channel 40 (FIGS. 1, 4–5 and 8–10). Top channel 40 includes a top plate 41, which tapers from a narrower to a wider width in extending rearwardly from bushing assembly 23 toward air spring 25, and a pair of spaced-apart sidewalls 42 which diverge in extending from bushing assembly 23 toward air spring 25. An axle mounting plate 43, which similarly generally tapers from a narrower width at bushing assembly 23 to a wider width as it extends rearwardly toward air spring 25, preferably is welded to sidewalls 42, wherein the welding pattern will be described in greater detail hereinbelow. Axle mounting plate 43 preferably is a one-piece integrally formed plate, but can be integrally formed using two or more pieces fastened together such as by welds, without affecting the overall concept of the present invention. Axle mounting plate 43 includes a front portion 44 and a rear portion 36, with the front portion generally following the tapering profile of top channel top plate 41 from bushing assembly 23 rearwardly to axle 28. Axle mounting plate rear portion 36 extends outboardly and inboardly beyond sidewalls 42, to facilitate assembly of axle/suspension system 20, as will be set forth hereinbelow, and also to facilitate attachment of shock absorber mounting bracket 35. Rear mounting plate portion 36 also serves to assist in dissipation of torsional loads imposed on axle 28.

Figure 2:
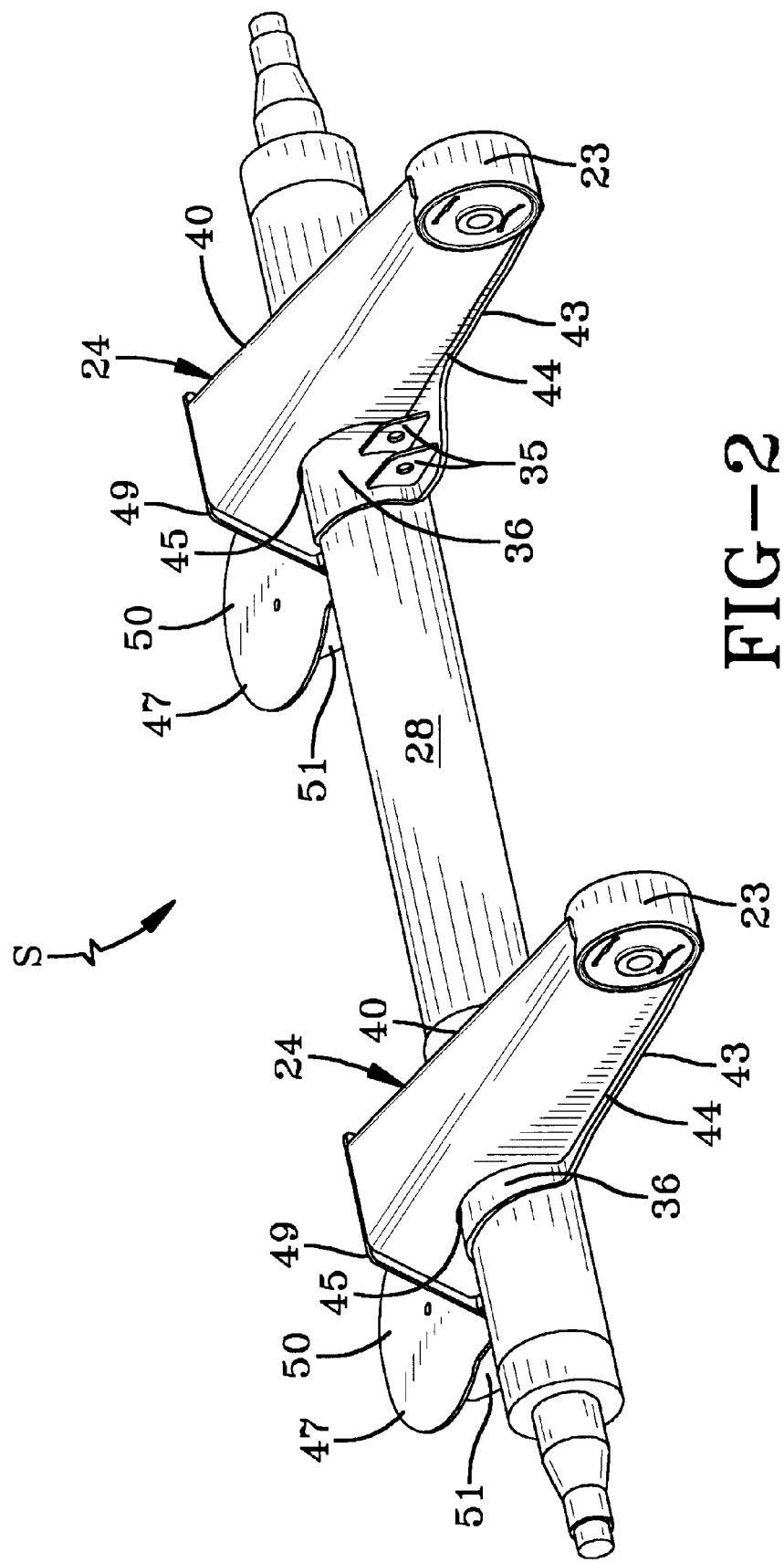
FIG. 2 is a reduced front perspective view of portions of the axle/suspension system of FIG. 1, shown removed from its mounting on a tractor-trailer frame.
Figure 4:
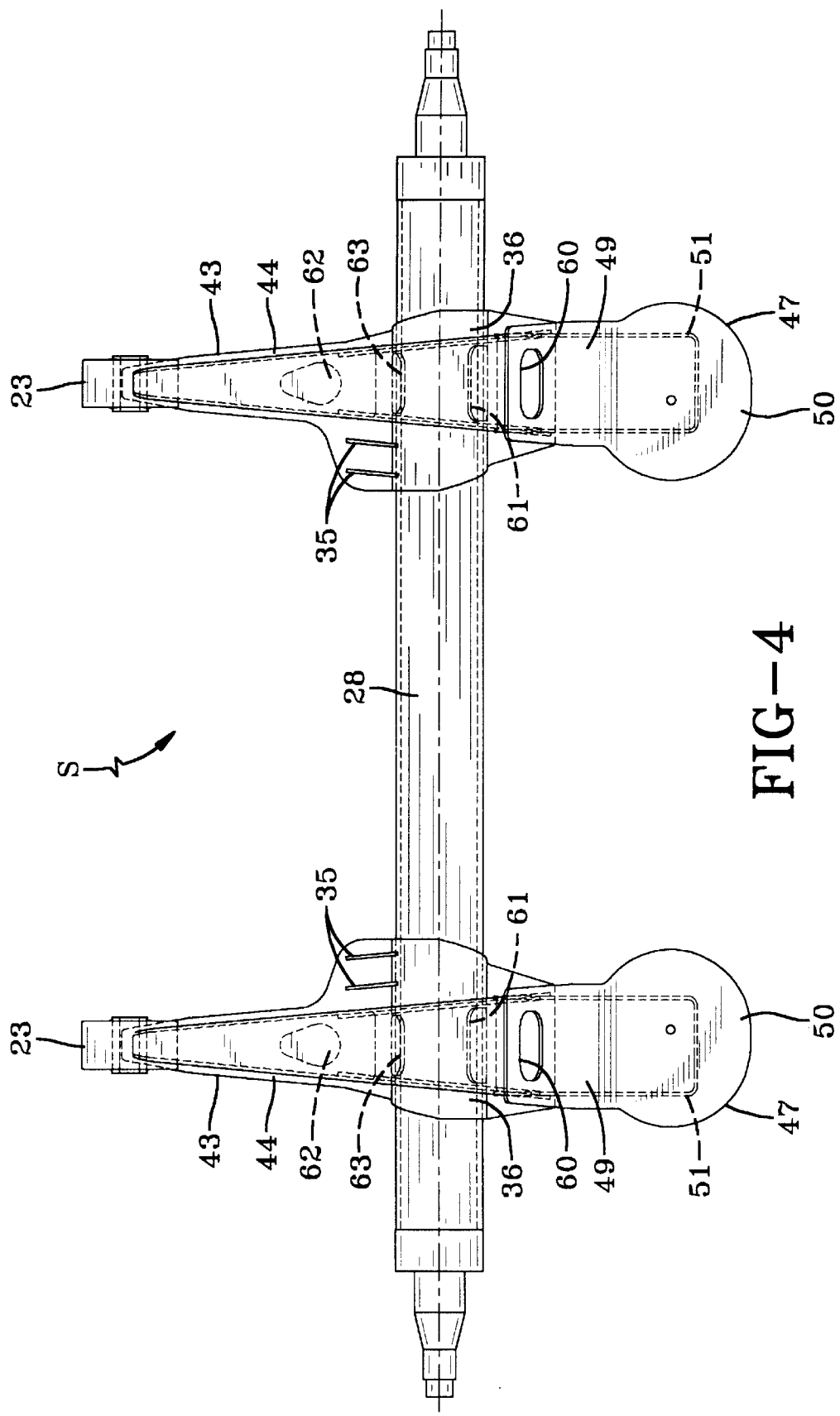
FIG. 4 is a top plan view of the portions of the axle/suspension system shown in FIGS. 2 and 3, with hidden parts represented by broken lines.
Figure 5:
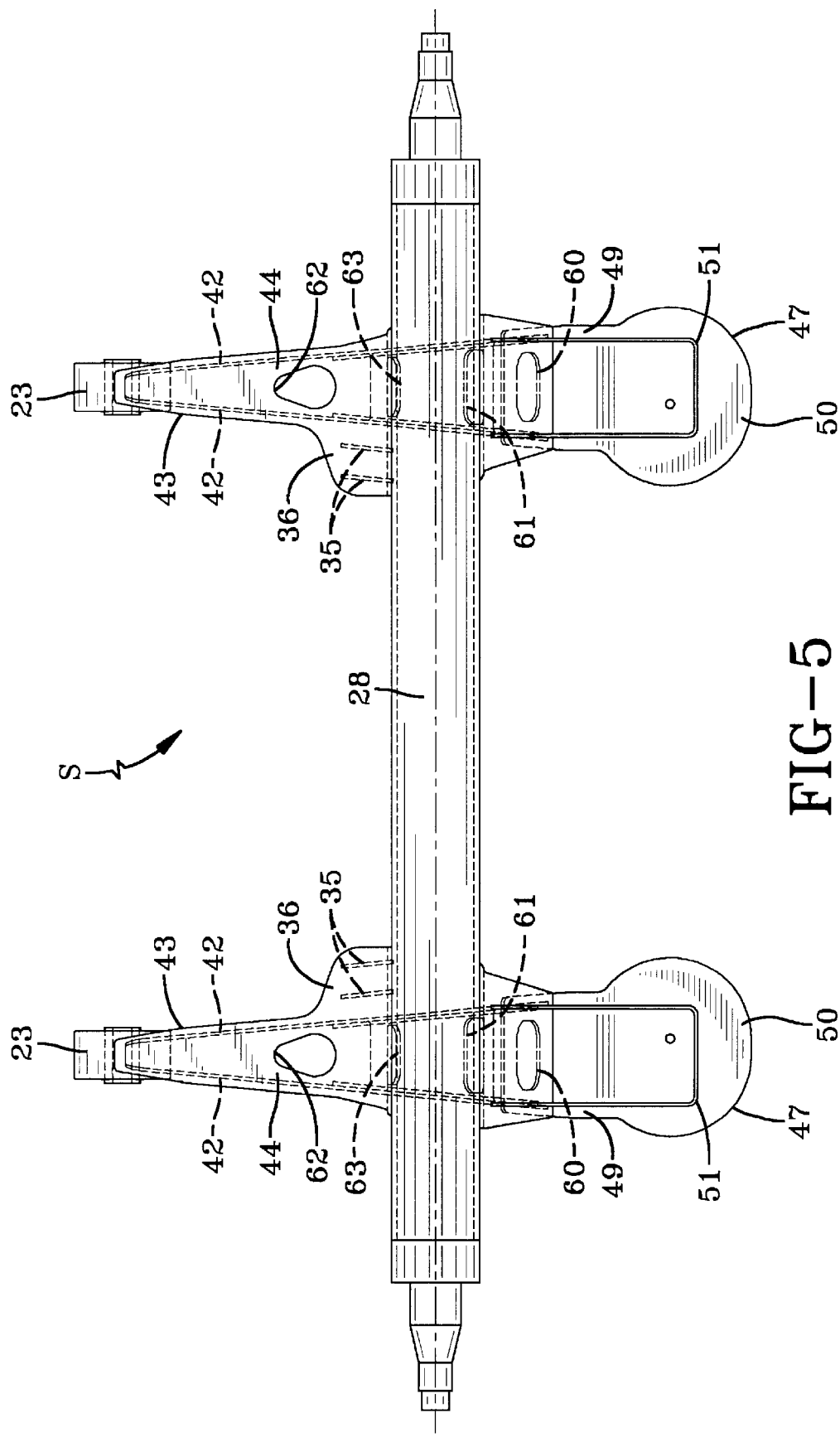
FIG. 5 is a bottom plan view of the portions of the axle/suspension system shown in FIGS. 2 through 4, with hidden parts represented by broken lines.
Figure 8:
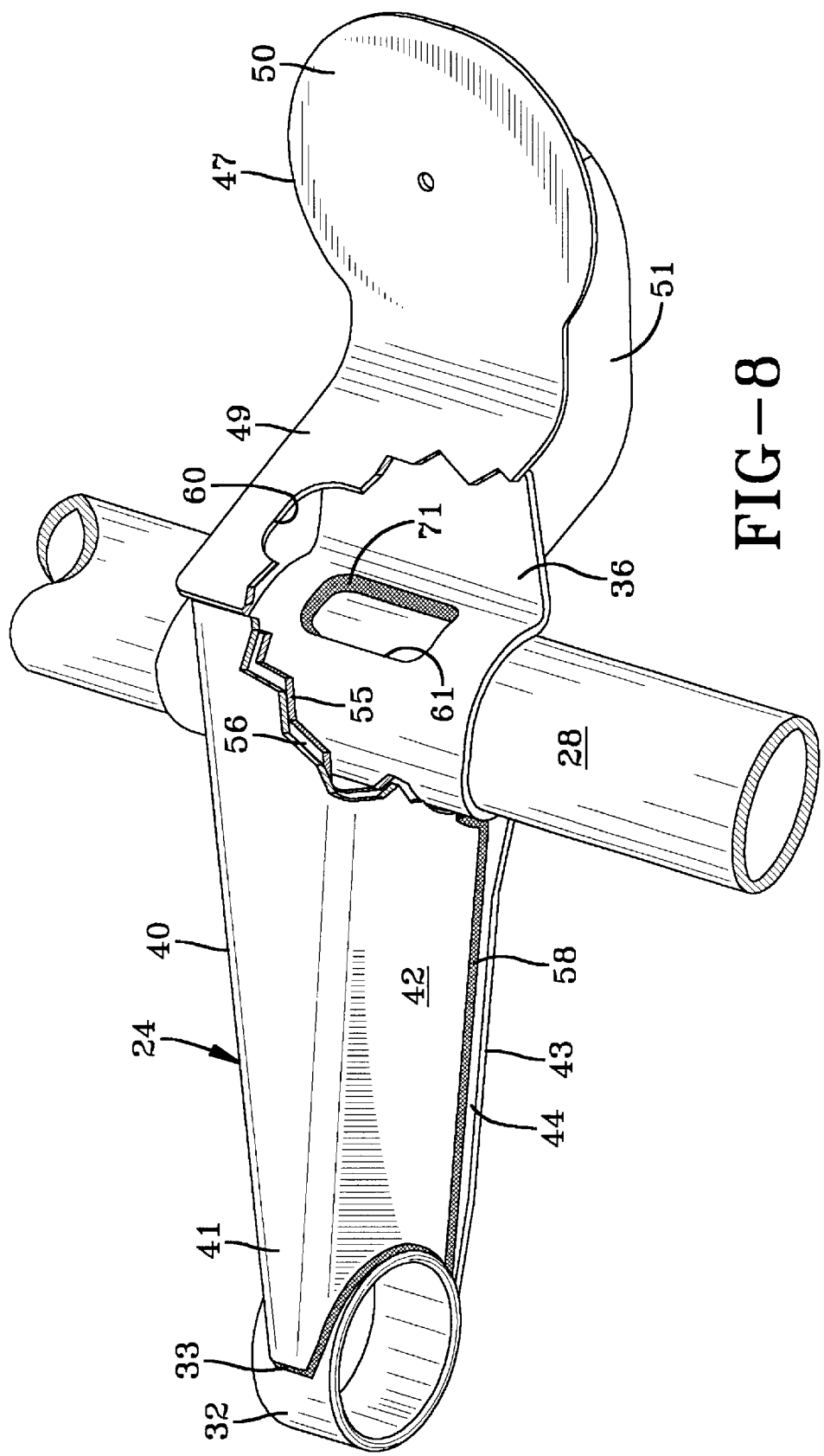
FIG. 8 is an enlarged fragmentary rear perspective view of one of the suspension beams, with portions broken away, showing the location of the rear window used to weld the axle mounting plate of the beam to the axle.

In accordance with another of the key features of the present invention, a rearward end of each sidewall 42 is formed with a generally semi-circular shaped cutout 45 (FIGS. 2–3). The corresponding section of axle mounting plate rear portion 36 similarly is formed with a generally complementary semi-circular shaped recess 46 (FIGS. 1 and 11), so that when beam 24 is preassembled the axle mounting plate rear portion seats in sidewall cutouts 45.

A generally obtuse angle-shaped plate 47 (FIGS. 1, 3, 4, and 8), when viewed in profile, is attached to the rearwardmost end of sidewalls 42 by welds 48. More specifically, a generally vertical front portion 49 of plate 47 is generally rectangular-shaped, and a horizontal rear portion 50 of the plate is generally circular-shaped for mounting and supporting air spring 25. The stability of plate 47 is enhanced by a frontward-facing generally U-shaped rib 51 (FIGS. 1 and 3–5) which is mounted on and depends from the bottom surfaces of plate 47 and axle mounting plate 43 by continuous weld 52.

Figure 9:
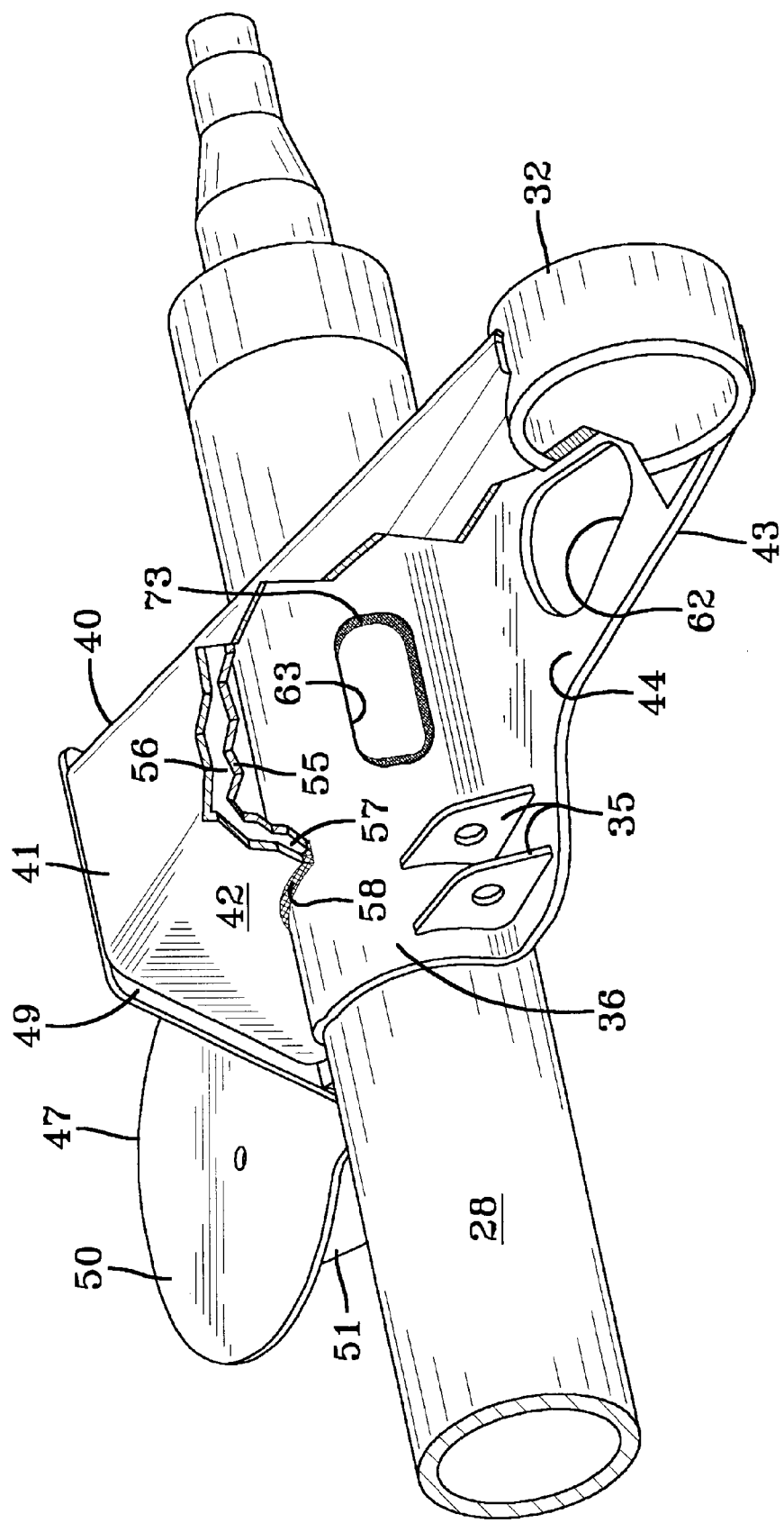
FIG. 9 is an enlarged fragmentary front perspective view of the suspension beam shown in FIG. 8, with portions broken away, showing the location of the front window and access opening therefore used to weld the axle mounting plate of the beam to the axle.
Figure 10:
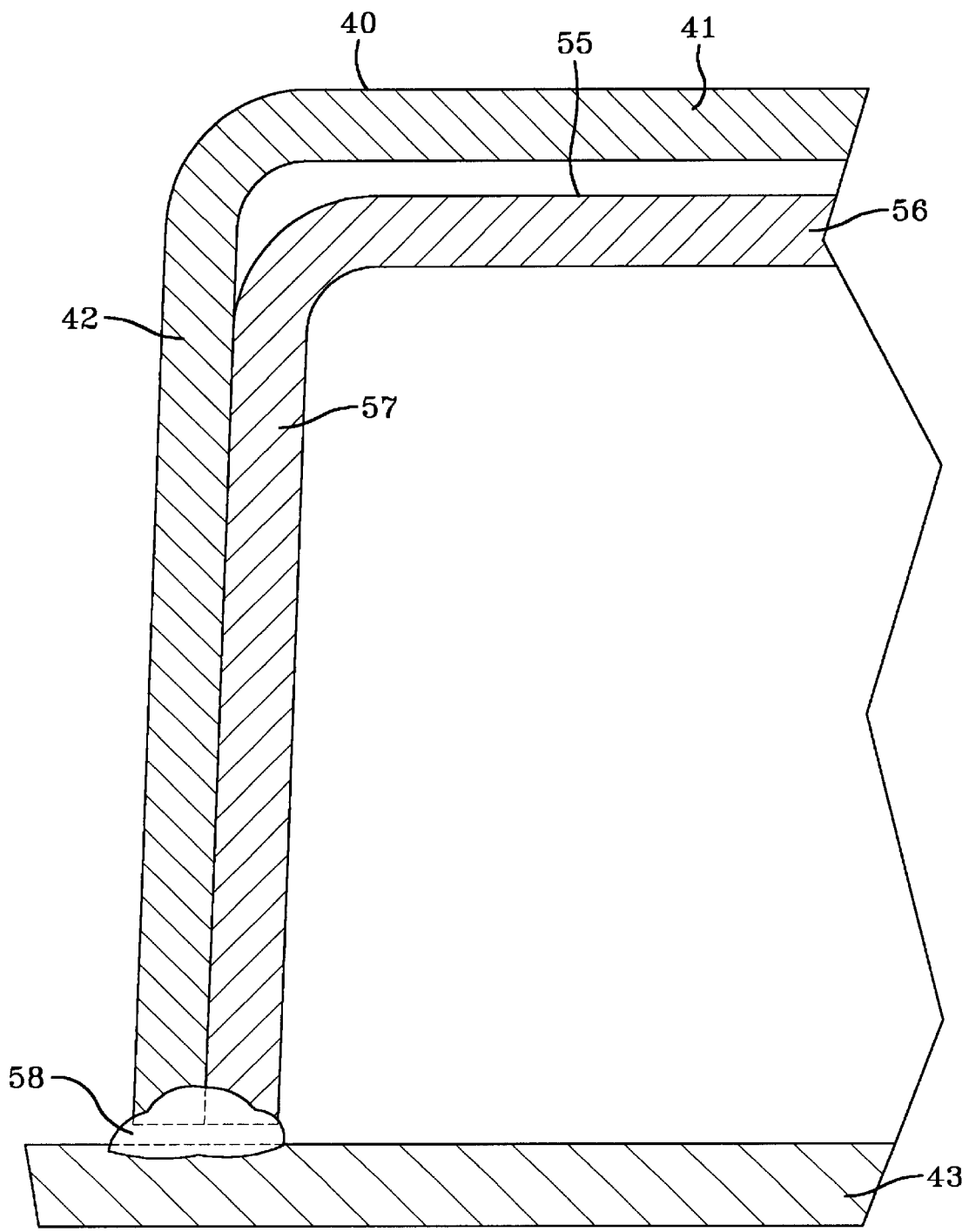
FIG. 10 is a greatly enlarged section taken along lines 10—10 of FIG. 1, and showing one of the pair of single weld beads used to interconnect the sidewalls, axle mounting plate and insert of the beam.

In accordance with still another important feature of the first embodiment of the present invention, and referring to FIGS. 1 and 9–10, an inverted generally U-shaped beam insert 55 is disposed in the rear portion of beam top channel 40 and is generally complementary in shape thereto. Insert 55 preferably is a one-piece integrally formed metal insert and includes a top plate 56 and a pair of spaced-apart sidewalls 57. It is important to note that during preassembly of beam 24, a single continuous weld 58 is utilized to securely interconnect each beam sidewall 42 to its respective insert sidewall 57 and axle mounting plate 43, thereby eliminating the need for subassembly of each component.

In accordance with yet another key feature of the present invention, axle 28 is mounted on beams 24 in the following manner. As noted hereinabove, beam 24 preferably is preassembled prior to mounting axle 28 thereon. At least mounting tube 32 of bushing assembly 23 also preferably is welded to beam 24 prior to mounting of axle 28. Inasmuch as each end of axle 28 is mounted in a similar manner on a respective one of beams 24 of axle/suspension system 20, the attachment of only one end of axle 28 on its respective beam will be described hereinbelow.

Figure 11:
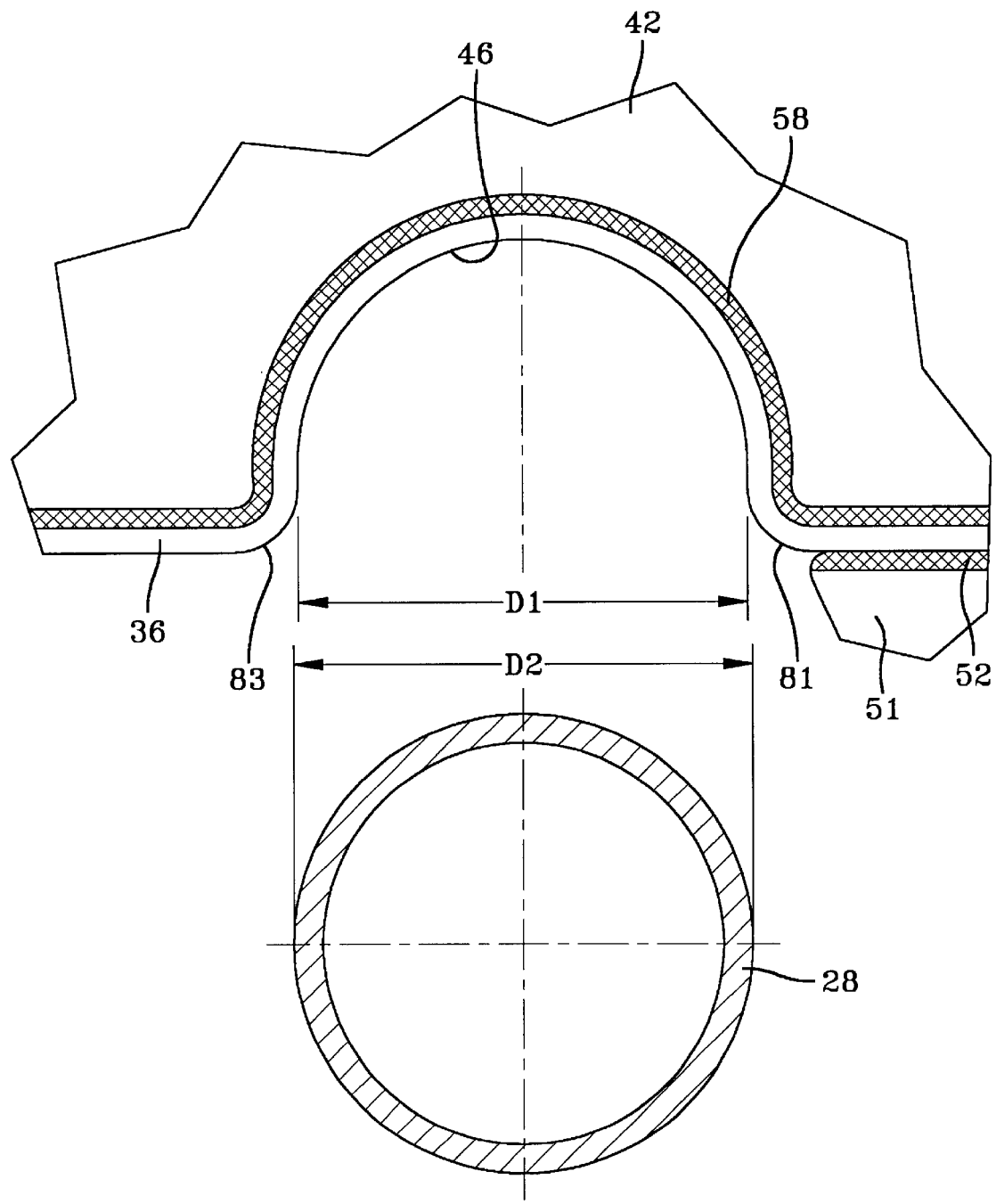
FIG. 11 is a greatly enlarged fragmentary side view of one of the beams and an axle represented in cross-section, illustrating one example of the relative diameters of an axle and the axle recess formed in the axle mounting plate, just prior to insertion of the axle in the recess.
Figure 12:
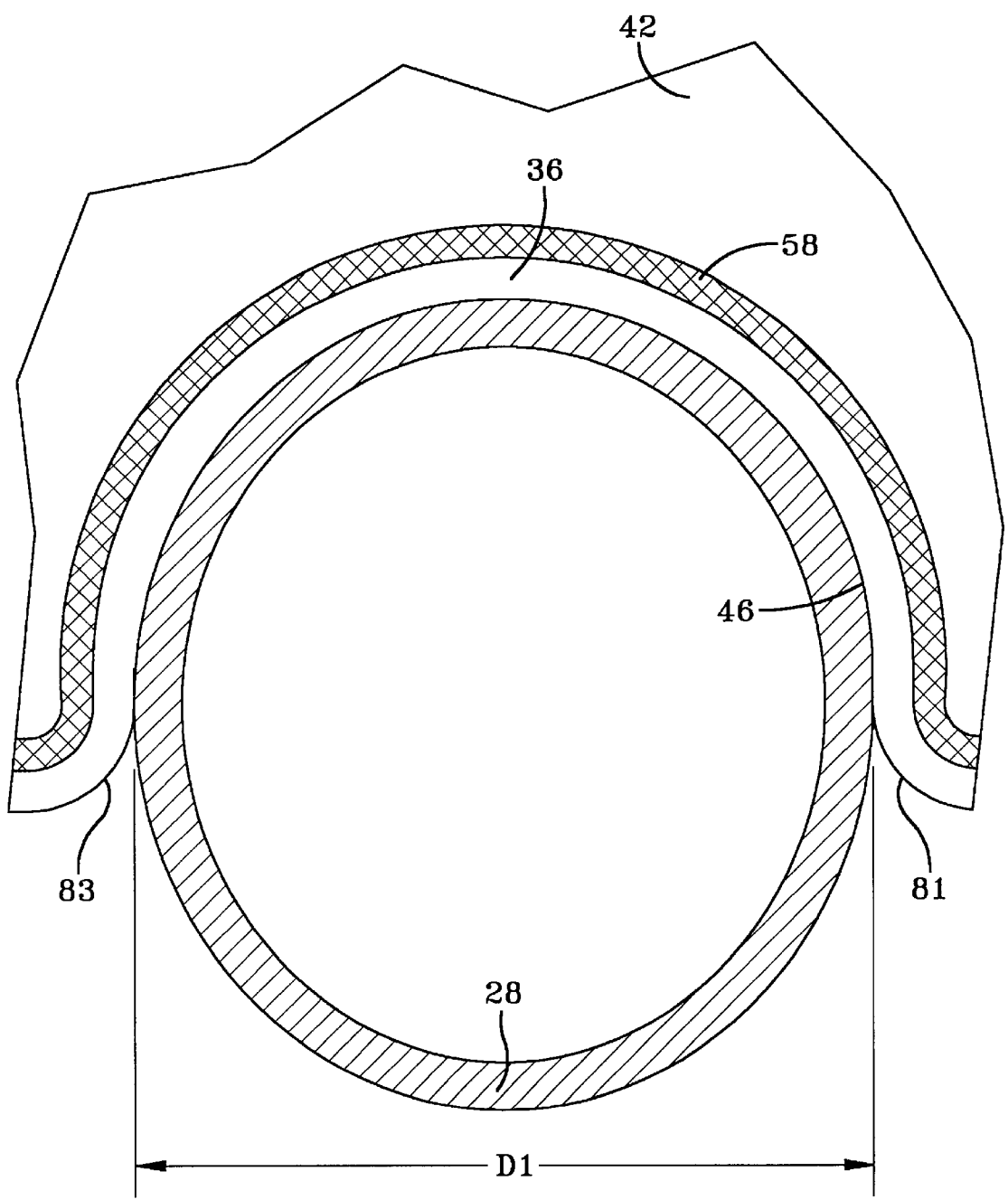
FIG. 12 is a further enlarged view similar to FIG. 11, but showing the axle seated in the axle mounting plate recess and subsequent to extrusion of the axle into the axle mounting plate recess to eliminate clearance and create intimate contact between the axle and the plate, resulting in deformation of the axle from a round shape to a generally oval or elliptical shape and creation of a constant compressive preload applied by the mounting plate to the axle.

As best shown in FIG. 11, axle mounting plate rear portion 36 defines semicircular recess 46 having a diameter D1 which can range from significantly smaller than to generally the same size as an outside diameter D2 of the smallest axle which will be mounted on beam 24. Also, recess 46 has a shape which is generally complementary to the periphery of generally the upper half of axle 28. Axle 28 is extruded into recess 46 by the application of an appropriate amount of force using any suitable means such as a hydraulic press (not shown). More particularly, the force is applied by the hydraulic press to the sections of axle mounting plate rear portion 36 which extend outboardly and inboardly beyond top channel sidewalls 42. The appropriate load is applied to axle mounting plate rear portion 36 not only to extrude axle 28 into recess 46, but also to intentionally deform the axle in the axle mount area from its generally round cross-sectional shape to a generally oval or elliptical shape, as best shown in FIG. 12. More specifically, merely force fitting axle 28 into beam recess 46 only would serve to create generally uninterrupted contact and possibly areas of clearance within the recess between the outer surface of the upper portion of the axle and the bottom surface of axle mounting plate 43, and especially could create clearance or mere uninterrupted contact at critical areas such as at the points of welds between the axle and the axle mounting plate. However, the present invention goes well beyond a simple force, press, or interference fit, each of which may in some cases also cause deformation of an axle, such that the application of an appropriate amount of force to axle mounting plate 43 bearing on axle 28, eliminates any clearance between the outer surface of the upper portion of the axle and the bottom surface of the axle mounting plate. Such lack of clearance effects intimate contact between the outer surface of the upper portion of axle 28 and the bottom surface of axle mounting plate 43 in the area of recess 46, resulting in a constant preload or compression condition between the contacting surfaces. It is believed that such a preload or compression condition can exist without actual deformation of axle 28, as long as lack of clearance between the axle and the axle mounting plate exists, especially at weld areas between the axle and axle mounting plate 43. This preload condition serves to strengthen axle 28, assists in securely capturing the axle in beam 24, and dissipates various stresses before they can adversely affect any welds between the beam and axle or the integrity of the axle itself. More specifically, this preload or compression condition reduces the compression to tension cycling range, especially in the area of any axle to beam welds, which are described immediately below, thereby reducing the stresses on such welds and the axle itself and improving the overall fatigue lives of the welds and axle.

In accordance with still another important feature of the present invention, and as best shown in FIGS. 1, 3–5, and 7–9, a cutout 60 is formed in front portion 49 of plate 47 to provide access to a window 61 formed in axle mounting plate rear portion 36 generally adjacent to the upper rear quadrant of axle 28. Similarly, a cutout 62 is formed in axle mounting plate front portion 44 to provide access to a window 63 formed in axle mounting plate rear portion 36 generally adjacent to the upper front quadrant of axle 28. More specifically, cutouts 60, 62 provide access for placing continuous welds 71, 73 in windows 61, 63, respectively, to supplement the preload condition described immediately above, for securing axle 28 to beam 24. Without cutouts 60, 62, preassembly of beam 24 and subsequent welding in windows 61, 63 would be impossible, resulting in the requirement that beam 24 be built-up around axle 28 and adding unwanted and costly assembly steps to the manufacturing process of axle/suspension system 20. It is important to note that windows 61, 63 and their accompanying welds 71, 73, respectively, are circumferentially offset, as best shown in FIG. 1, upwardly from a pair of lowermost edges 81, 83, respectively, wherein edges 81, 83 define the outermost limit of axle mounting plate recess 46. Windows 61, 63 and welds 71, 73, respectively, further are circumferentially offset downwardly from vertical axis plane V of axle 28. In contrast, many prior art axle mount assemblies having a structure which generally surrounds the upper half of an axle, utilize elongated horizontal welds adjacent to or directly on the interface of the lowermost edges of the surrounding structure and the axle itself. Although such a welding pattern generally counteracts vertical loads and resulting stresses encountered by the suspension system during operation of the vehicle, the toes of these welds are subject to fatigue stresses such as tension stress emanating especially from torsional and fore-aft loads. Thus, the present invention counters such stress problems by offsetting windows 61, 63 and their respective continuous welds 71, 73, and in combination with the capture of axle 28 in axle mounting plate recess 46 which creates a constant preload or compression condition therebetween, serves to strengthen the entire axle/suspension system 20 and also provides for sturdy attachment of the axle to the beam.

After assembling subassembly S shown in FIGS. 2–7, the subassembly is mounted on vehicle frame 30 in the usual manner described hereinabove and illustrated in FIG. 1.

A second embodiment of the present invention is an air-ride trailing arm spring beam-type axle/suspension system for a wheeled vehicle, and is indicated generally at 20' and is shown in FIGS. 13 and 14. Inasmuch as trailing arm spring beam-type axle/suspension system 20' operates in the same environments and has many structural features identical or very similar to rigid beam-type axle/suspension system 20 of the first embodiment of the present invention described in detail hereinabove, only significant differences between the two embodiments will be described immediately below. Otherwise, identical or similar parts of second embodiment 20' will be identified in the drawings and the description that follows with similar numerals followed by a raised prime indicia.

A front end 123 of a trailing a spring beam 124 is pivotally mounted on a bolt 127. Bolt 127 is inunovably transversely mounted on hanger 22' in a manner well known in the suspension art. An air spring 25' is suitably mounted on and extends between the upper surface of a rear end 136 of beam 124 and frame rail 31'. A shock absorber 26' extends between and is mounted by suitable means at one of its ends directly to hanger 22', and at the other of its ends to a bracket 129 secured to beam 124. More specifically, bracket 129 is captured against beam 124 by a pair of U-bolts 132, each of which extends-about a-respective one of a pair of ends of bracket 129. The pair of legs of each U-bolt 132 pass downwardly through a pair of spaced openings (not shown) formed in a generally flat plate 134 which abuts the bottom surface of beam 124 at about the mid-point of the beam. A pair of nuts 135 are threadably engaged with the legs of each U-bolt 132 to secure shock absorber 26', bracket 129 and plate 134 to spring beam 124.

In accordance with one of the key features of the second embodiment 20' of the present invention, an axle mounting plate 137 formed of a sturdy material such as steel, is secured to and depends from plate 134 below spring beam 124. More particularly, axle mounting plate 137 includes front and rear opposed L-shaped generally vertically disposed walls 138, 139, respectively, and generally semicircular-shaped plate 140 which extends between and is attached to the short horizontal portion of each wall 138, 139 by stitch welds 141 and elongated transverse welds 142. However, it is understood that axle mounting plate 137 can be formed as an integral one-piece plate without affecting the concept of the present invention. The long vertical portion of each front and rear L-shaped wall 138, 139, is attached to respective front and rear ends of plate 134 by a plurality of interrupted welds 143. A pair of transversely spaced gussets 144 extend between and are complementary in shape to the area defined by axle mounting plate 137 and flat plate 134 for strengthening the axle mounting plate. Axle mounting plate 137 preferably is preassembled prior to its incorporation into axle/suspension system 20', but can also be built-up around axle 28' during manufacture of the system without adversely affecting the overall concept of the present invention. Axle 28' then is mounted in a recess 146 defined by semicircular plate 140 in a manner similar to that described hereinabove for the first embodiment of the present invention, such that a constant preload or compression is exerted on axle 28' by axle mounting plate 137. Axle 28' also is welded to axle mounting plate 137 in a manner similar to the welding of axle 28 to axle mounting plate 43 in first embodiment 20 of the present invention, and obtains the same advantages. More particularly, front and rear cutouts 162, 160 are formed in front and rear L-shaped walls 138, 139, respectively, of axle mounting plate 137. Cutouts 162, 160 provide access to windows 163, 161 formed in semicircular plate 140 of axle mounting plate 137. Windows 163, 161 are disposed generally adjacent to the upper front and upper rear quadrants of axle 28' and have continuous welds 73', 71' (only weld 73' is shown) disposed therein, respectively.

A third embodiment of the present invention is an air-ride trailing arm rigid beam-type axle/suspension system for a wheeled vehicle, and is indicated generally at 20" and is shown in FIGS. 15–21. Inasmuch as trailing arm rigid beam-type axle/suspension system 20" operates in the same environments and most of its structural features are identical or very similar to rigid beam-type axle/suspension system 20 of the first embodiment of the present invention described in detail hereinabove, only significant differences between the two embodiments will be described immediately below. Otherwise, identical or similar parts of second embodiment 20" will be identified in the drawings and in the description that follows with similar numerals followed by a raised double prime indicia.

Figure 15:
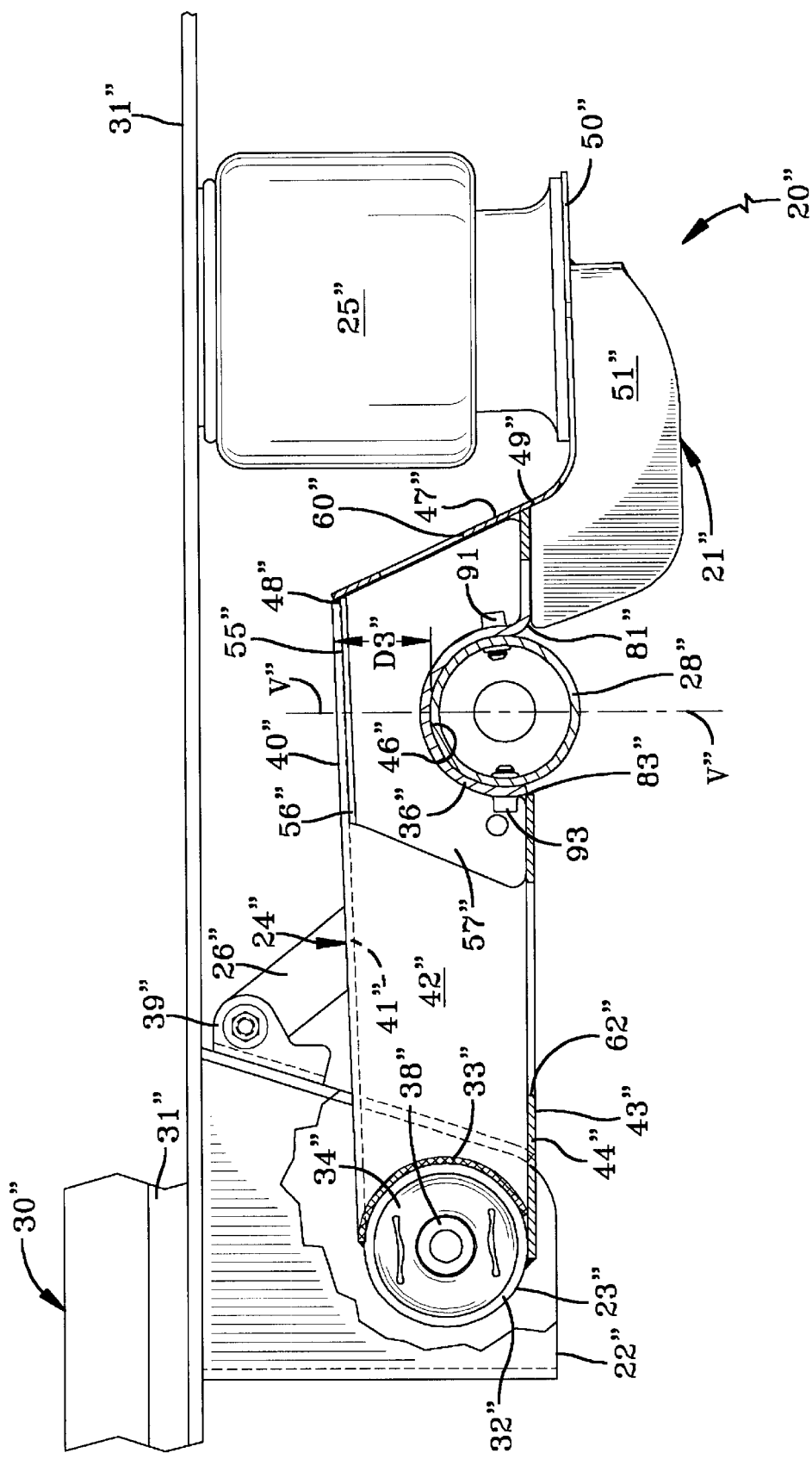
FIG. 15 is a partially sectioned fragmentary outboard side elevational view of a third embodiment of the trailing arm axle/suspension system of the present invention, wherein the arm of the suspension assembly is a top mount or overslung rigid beam and bolts are utilized instead of welds to assist in securing the axle to the beam, and hidden parts are represented by broken lines.
Figure 16:
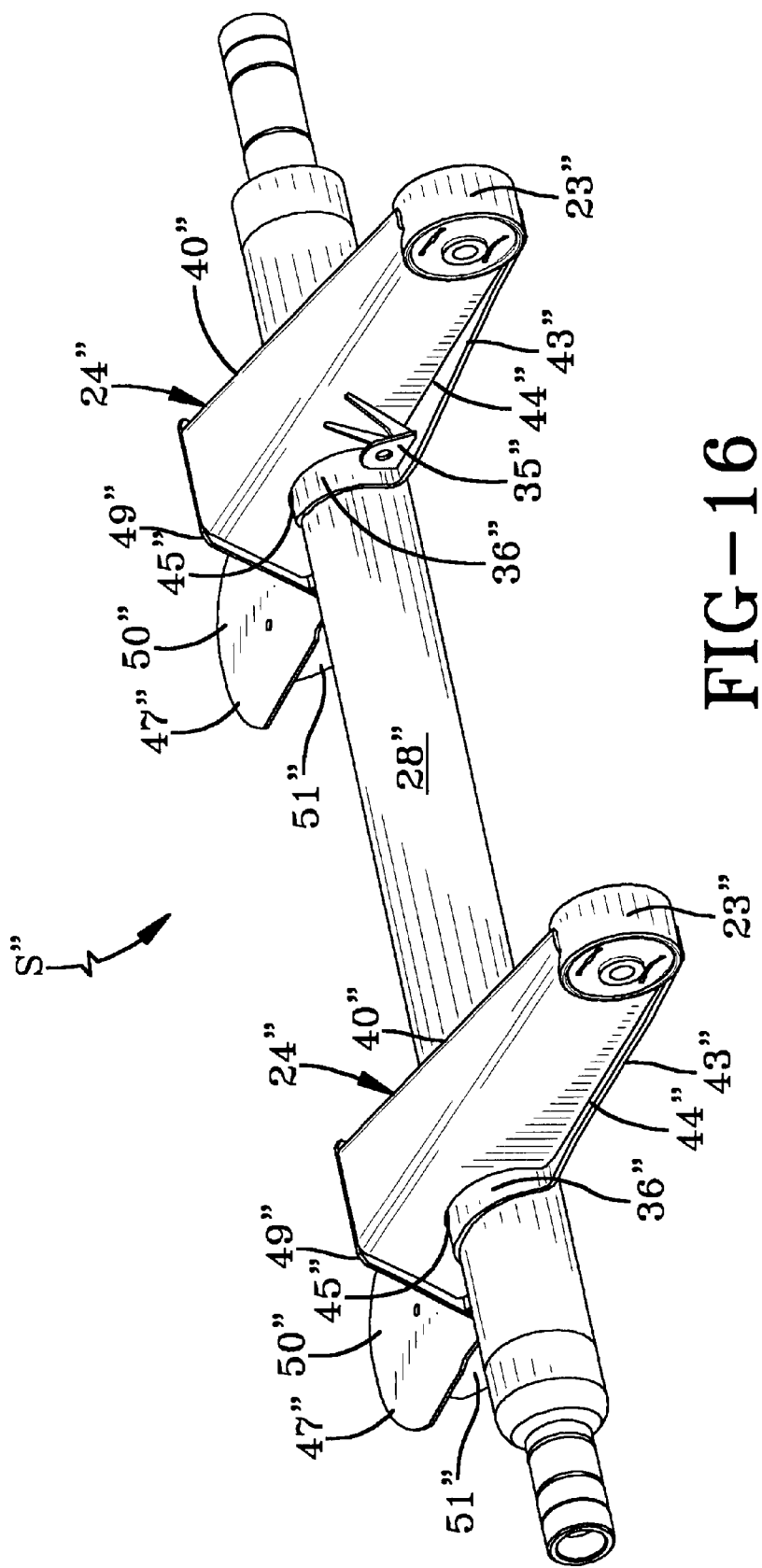
FIG. 16 is a reduced front perspective view of portions of the axle/suspension system of FIG. 15, shown removed from its mounting on a tractor-trailer frame.
Figure 17:
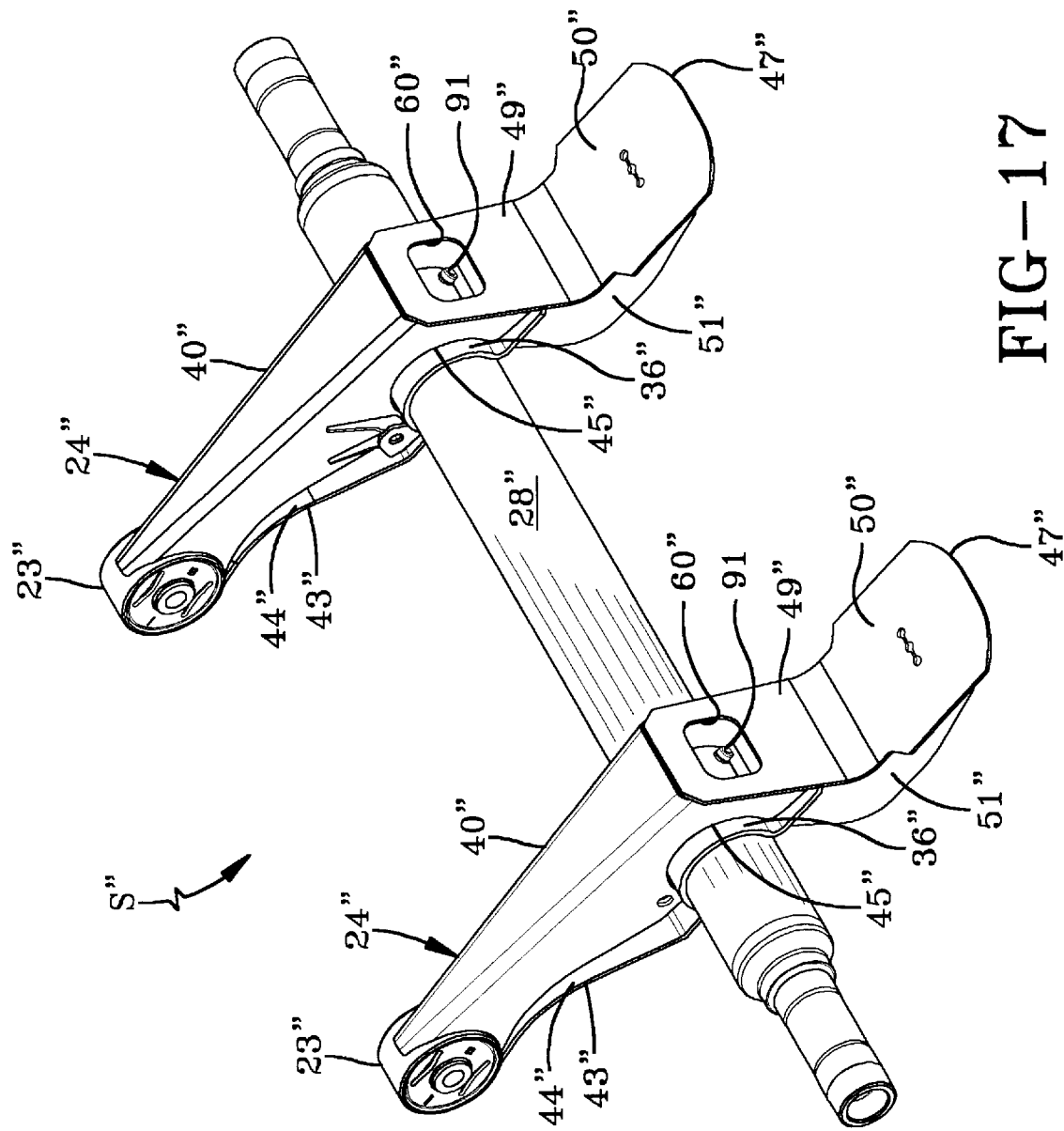
FIG. 17 is a rear perspective view of the portions of the axle/suspension system shown in FIG. 16.
Figure 18:
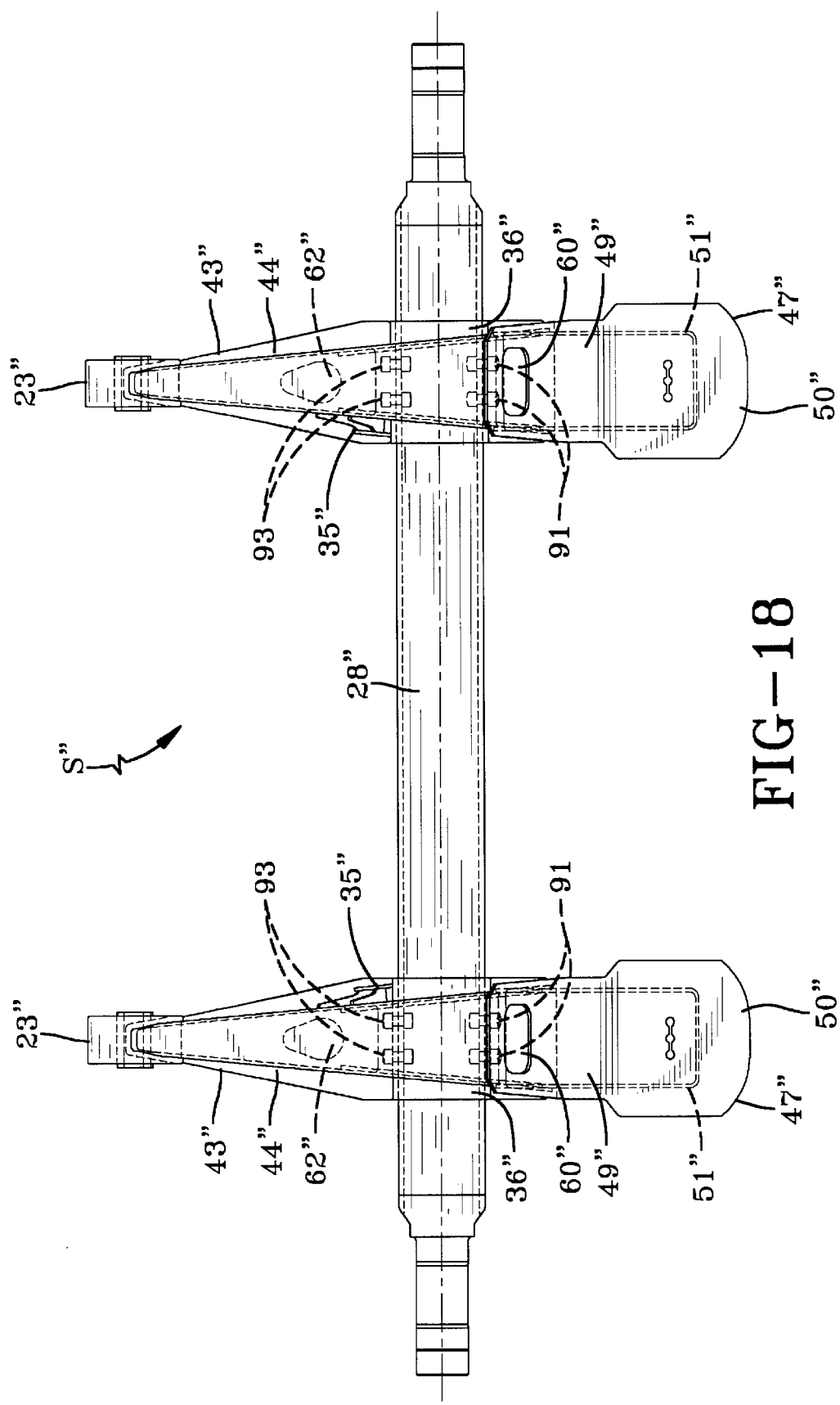
FIG. 18 is a top plan view of the portions of the axle/suspension system shown in FIGS. 16 and 17, with hidden parts represented by broken lines.
Figure 19:
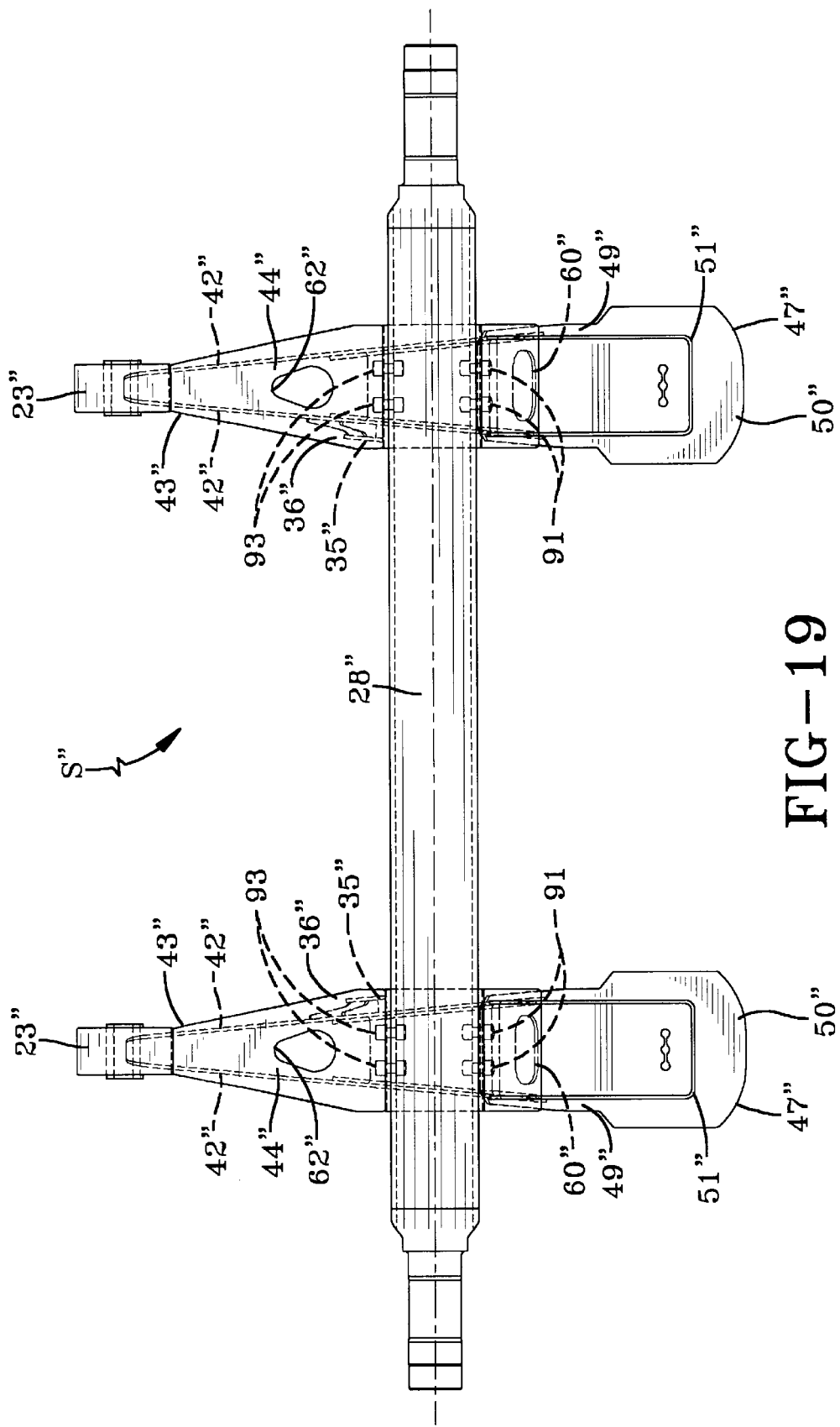
FIG. 19 is a bottom plan view of the portions of the axle/suspension system shown in FIGS. 16–18, with hidden parts represented by broken lines.
Figure 21:
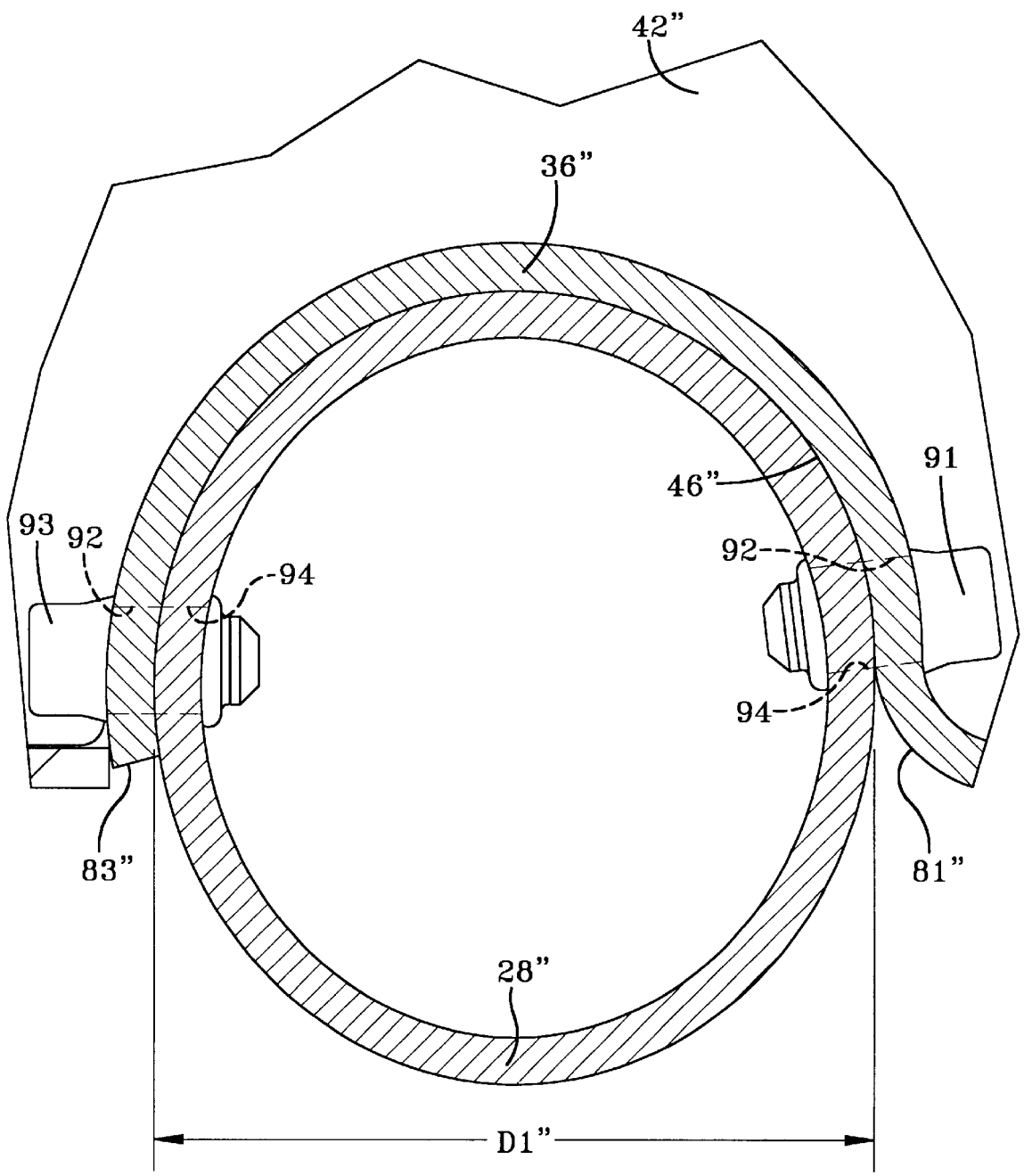
FIG. 21 is a further enlarged view similar to FIG. 20, but showing the axle seated in the axle mounting plate recess and subsequent to extrusion of the axle into the axle mounting plate recess to eliminate clearance and create intimate contact between the axle and the plate, resulting in deformation of the axle from a round shape to a generally oval or elliptical shape and creation of a constant compressive preload applied by the mounting plate to the axle.

The only significant difference between first embodiment beam-type axle/suspension system 20 and third embodiment beam-type axle/suspension system 20" is that rather than utilizing windows 61, 63 and continuous welds 71, 73, respectively, in those windows to supplement the preload condition described hereinabove for securing axle 28 to beam 24, third embodiment beam-type axle/suspension system 20" utilizes huck bolts 91, 93. Bolts 91, 93 also are circumferentially offset, as best shown in FIG. 15, upwardly from a pair of lowermost edges 81", 83", respectively, of axle mounting plate recess 46" and downwardly from vertical axis plane V" of axle 28". Each bolt 91, 93 is passed through a respective one of pairs of aligned openings 92, 94 formed in axle mounting plate rear portion 36" and axle 28", respectively, as best shown in FIG. 21. As with first embodiment 20 of the present invention, third embodiment 20" counters stress problems associated with prior art axle to beam connections by offsetting bolts 91, 93, and in combination with the capture of axle 28" in axle mounting plate recess 46" which creates a constant preload or compression condition therebetween, serves to strengthen the entire axle/suspension system 20" and also provides for sturdy attachment of the axle to the beam. It is understood that means other than huck bolts 91, 93, could be utilized, such as rivets or other fasteners, without affecting the concept of the present invention.

All three of the above-described embodiments of the present invention solve many problems encountered in prior art suspension assembly trailing arm overslung axle mounts. Due to variations in axle diameters, the mount seat diameter for an axle heretofore was at least nominally larger than the outside diameter of the axle to allow for manufacturing tolerances as well as varying axle sizes. However, such a relatively loose fit requires robust attachment of the axle to the beam and results in the use of the above-mentioned brackets, clamps, bolts, and the like, to achieve a sturdy mounting. As previously discussed, however, such additional parts add unwanted weight and cost, the added cost stemming both from parts and labor, to the axle/suspension system. Even in prior art axle mounts which refrain from utilizing such a clearance fit, but rather use either a force, press or interference fit which each may cause some deformation of the axle, none of the known prior art systems utilize an axle to axle mounting plate mating which is clearance-free and which exhibits a constant preload between the entire surfaces of intimate contact between the axle and axle mounting plate, particularly at the welds or bolts, so that such fastening means are in a constant compressive state rather than cycling between compression and undesirable tension states.

The first, second and third embodiments of the present invention solve these problems by creating a universal recess 46, 146, 46" in mounting plate 43, 137, 43" respectively, which has a diameter which can range from significantly smaller than to generally the same size as the diameter of the smallest axle which will be seated therein. This fact, in combination with the extrusion of the axle into the axle mounting plate to achieve the clearance-free constant preload or compression condition, together with the continuous window welds or bolts offset from the lowermost edges of the axle mounting plate recess and the vertical axis plane of the axle, creates a stronger axle and more robust mounting of the axle to the beam. This sturdy assembly is achieved without requiring costly additional weight-adding parts or labor in the first and third embodiments of the present invention, and using only minimal additional parts in the second embodiment of the present invention. Moreover, the offset location of the continuous window welds or bolts effectively removes the welds or bolts from vehicle torsional and longitudinal load stresses experienced by prior art elongated welds or other fastening means disposed along or adjacent to and between the ends of a part which partially surrounds the axle and the axle itself.

It should also be noted that the relatively short distance D3, D3" (FIGS. 1 and 15, respectively) between the top of axle 28, 28" and top channel plate 41, 41" of beam 24, 24" in the first and third embodiments, respectively, of the present invention eliminates clearance problems inherent in many prior top mount rigid beams when used in low ride-height applications. The short distance D3, D3" is made possible by insert 55, 55" which effectively thickens sidewalls 42, 42" of beam 24, 24". More specifically, insert 55, 55" stiffens beam 24, 24" in the axle mount area of sidewall cutouts 45, 45" and prevents curved beam phenomena, which is well known in the art, or separation of axle mounting plate semicircular recess 46, 46" from axle 28, 28" and from sidewalls 42, 42" by increasing beam bending strength in this highly loaded area.

It is understood that although a tapered beam 24, 24" is shown and described herein for the first and third embodiments of the present invention, other types of overslung or top mount beams can be utilized without affecting the overall concept of the invention. Moreover, it is understood that all three embodiments of the present invention can be utilized for different cross-sectional shapes of axles, such as rectangular, square or oval/elliptical. It is further understood that the structures and concepts shown and described herein for all three embodiments of the present invention for top mount or overslung beams, can be utilized for and applied to bottom mount or underslung beam applications with only minor modifications to the structure and arrangement of parts as disclosed.

FIG. 22 is an illustration of how the third embodiment of the present invention can be utilized in a bottom mount beam application. The beam and axle structures both are substantially identical to the structures shown in FIG. 20, but beam axle mounting plate semi-circular recess 46" faces upwardly to receive axle 28" on top of the beam, rather than downwardly to receive axle 28" below the beam as illustrated in FIG. 20. Identical or similar parts in FIGS. 20 and 22 thus have been identified with similar numerals, except that a raised triple prime indicia has been added to certain numerals to distinguish the bottom mount-type beam shown in FIG. 22 over the top mount-type beam shown in FIG. 20.

Finally, it is understood that although the preferred embodiments of the present invention shown and described hereinabove exhibit a generally clearance-free interface between the portion of the axle which is mounted in the axle mounting plate and the plate itself, some clearance could exist without affecting the concept of the present invention. More particularly, applicants contemplate a structure whereby the axle is extruded into the axle mounting plate and areas of clearance do exist therebetween, except that in the critical areas of welds or other fastening means such as bolts which assist in securing the axle to the axle mounting plate, a constant preload or compression exists such that the fastening means are free of stresses which can cause their failure or failure of the axle.

Accordingly, the improved trailing arm axle/suspension system for wheeled vehicles is simplified, provides an effective, safe, inexpensive, and efficient mount which achieves all the enumerated objectives, provides for eliminating difficulties encountered with prior mount assemblies, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved trailing arm axle/suspension, system is constructed, arranged and used, the characteristics of the construction and arrangement, and the advantageous, new and useful results obtained; the new and useful structures, devices, elements, arrangements, parts and combinations, and methods are set forth in the appended claims.

What is claimed is:

1. A vehicle axle/suspension assembly, said assembly including:
   at least one suspension beam mounted on a frame of a vehicle, said suspension beam comprising:
   i) a compressive axle mounting plate formed with a recess, said recess having a shape generally complementary to and surrounding about half of the periphery of an axle, said axle mounting plate having a pair of edges defining the outermost limit of the recess, said recess being a smaller size or an equal size to said surrounded axle periphery prior to mounting said axle on said axle mounting plate, and upon mounting the axle on the axle mounting plate, at least a portion of an interface between said surrounded axle periphery and said axle mounting plate is in continuous compressive contact; and ii) means disposed adjacent to said interface between the surrounded axle periphery and the axle mounting plate for securing the axle to said axle mounting plate, whereby said means is substantially in compression.

2. The vehicle axle/suspension assembly of claim 1, in which said means for securing said axle mounting plate to said axle is selected from the group consisting of a weld and a fastener; and in which at least one opening is formed in said compressive axle mounting plate, said opening being circumferentially offset from said edges defining the outermost limit of the recess, the opening further having said securing means disposed therein for securing the axle mounting plate to the axle.

3. The vehicle axle/suspension assembly of claim 2, in which a weld is used to secure said axle mounting plate to said axle; and in which said weld is disposed in said axle mounting plate opening about a periphery of said opening and is continuous.

4. The vehicle axle/suspension assembly of claim 3, in which a pair of openings is formed in said axle mounting plate; and in which each of said openings is circumferentially offset from a vertical axis plane of said axle.

5. The vehicle axle/suspension assembly of claim 4, in which said suspension beam is a top mount beam; and in which each of said axle mounting plate openings is located adjacent to a respective one of an upper front and an upper rear quadrant of said axle.

6. The vehicle axle/suspension assembly of claim 5, in which said suspension beam is a rigid beam; in which a first cutout is formed in said axle mounting plate for accessing said upper front axle quadrant opening for securing the axle mounting plate to said axle; in which a first end of the beam is pivotally attached to said vehicle frame and a second end of said beam is attached to an air spring through an end plate attached to said beam second end; in which said end plate supports said air spring which extends between said end plate and the vehicle frame; and in which a second cutout is formed in the end plate for accessing said upper rear axle quadrant opening for securing said axle mounting plate to the axle.

7. The vehicle axle/suspension assembly of claim 6, in which a generally U-shaped rib is attached to and depends from said end plate and said axle mounting plate for supporting the end plate.

8. The vehicle axle/suspension assembly of claim 6, in which said rigid suspension beam includes an inverted U-shaped top channel; in which said top channel includes a pair of spaced-apart sidewalls and a top wall; in which an inverted U-shaped insert having a generally complementary size and shape to the top channel is disposed within said top channel adjacent to said axle mounting plate recess; in which said insert includes a pair of spaced-apart sidewallalls and a top wall; and in which each of said insert sidewalls is attached to a respective one of said top channel sidewalls and said axle mounting plate with a single weld.

9. The vehicle axle/suspension assembly of claim 8, in which said axle mounting plate extends outboardly and inboardly beyond said top channel sidewalls adjacent to said axle mounting plate recess to provide a force bearing surface for extruding said axle into the mounting plate recess.

10. The vehicle axle/suspension assembly of claim 5, in which said suspension beam is a spring beam; in which said axle mounting plate includes a front end and a rear end; in which the axle mounting plate is attached to and depends from said spring beam; in which a first cutout is formed in said axle mounting plate front end for accessing said upper front axle quadrant opening for securing said axle mounting plate to said axle; in which a second cutout is formed in the axle mounting plate rear end for accessing said upper rear axle quadrant opening for securing the axle mounting plate to the axle; in which a first end of said beam is pivotally attached to said vehicle frame and a second end of said beam is attached to an air spring; and in which said air spring extends between said beam second end and the vehicle frame.

11. The vehicle axle/suspension assembly of claim 10, in which said axle mounting plate includes a pair of transversely spaced-apart, front to rear extending gussets.

12. The vehicle axle/suspension assembly of claim 4, in which said suspension beam is a bottom mount beam; and in which each of said axle mounting plate openings is located adjacent to a respective one of a lower front and a lower rear quadrant of said axle.

13. The vehicle axle/suspension assembly of claim 12, in which said suspension beam is a rigid beam, in which a first cutout is formed in said beam for accessing said lower front axle quadrant opening for securing the axle mounting plate to said axle; in which a first end of the beam is pivotally attached to said vehicle frame and a second end of said beam is attached to an air spring; in which said air spring extends between said beam second end and the vehicle frame; and in which a second cutout is formed in the beam rearwardly of said first cutout for accessing said lower rear axle quadrant opening for securing said axle mounting plate to the axle.

14. The vehicle axle/suspension assembly of claim 13, in which the rigid suspension beam includes a U-shaped bottom channel; and in which said bottom channel includes a pair of spaced-apart sidewalls and a bottom wall.

15. The vehicle axle/suspension assembly of claim 14, in which said axle mounting plate extends outboardly and inboardly beyond said bottom channel sidewalls adjacent to said axle mounting plate recess to provide a force bearing surface for extruding said axle into the mounting plate recess.

16. The vehicle axle/suspension assembly of claim 12, in which said suspension beam is a spring beam; in which said axle mounting plate includes a front end and a rear end; in which the axle mounting plate is attached to and extends upwardly from said beam; in which a first cutout is formed in said axle mounting plate front end for accessing said lower front axle quadrant opening for securing said axle mounting plate to said axle; in which a second cutout is formed in said axle mounting plate rear end for accessing said lower rear axle quadrant opening for securing the axle mounting plate to the axle; in which a first end of the beam is pivotally attached to the vehicle frame and a second end of said beam is attached to an air spring; and in which said air spring extends between said beam second end and the vehicle frame.

17. The vehicle axle/suspension assembly of claim 16, in which the axle mounting plate includes a pair of transversely spaced-apart, front to rear extending gussets.

18. The vehicle axle/suspension assembly of claim 1, in which a cross-sectional shape of said axle adjacent to said suspension beam is deformed such that it has a different shape than an original cross-sectional shape of said axle prior to mounting said axle on said axle mounting plate.

19. The vehicle axle/suspension assembly of claim 1, in which said axle mounting plate is free of additional parts and structure for securing said axle.

20. The vehicle axle/suspension assembly of claim 1, in which said axle is mounted in a pair of spaced-apart suspension beams.

21. A method of assembling a vehicle axle/suspension system, said method including the steps of:
  a) preassembling at least one suspension beam including a compressive axle mounting plate formed with a recess, said recess having a shape generally complementary to generally half of the periphery of an axle for surrounding said axle half periphery, said axle mounting plate having a pair of edges defining the outermost limit of the recess, said recess being a smaller size or an equal size to the axle half periphery;
  b) extruding said axle half periphery into the recess so that at least a portion of an interface between said axle half periphery and said axle mounting plate is in continuous compressive contact;
  c) disposing means adjacent to said interface between the axle half periphery and the axle mounting plate for securing the axle to said axle mounting plate, said means being substantially in compression; and
  d) mounting said suspension beam and said axle on a frame of a vehicle.

22. The method of assembling a vehicle axle/suspension system of claim 21, in which said means for securing said axle mounting plate to said axle is selected from the group consisting of a weld and a fastener; and in which at least one opening is formed in said compressive axle mounting plate, said opening being circumferentially offset from said edges defining the outermost limit of the recess, the opening further having said securing means disposed therein for securing the axle mounting plate to the axle.

23. The method of assembling a vehicle axle/suspension system of claim 22, in which a weld is used to secure said axle mounting plate to said axle; and in which said weld is disposed in said axle mounting plate opening about a periphery of said opening and is continuous.

24. The method of assembling a vehicle axle/suspension system of claim 23, in which a pair of openings is formed in said axle mounting plate; and in which each of said openings is circumferentially offset from a vertical axis plane of said axle.

25. The method of assembling a vehicle axle/suspension system of claim 24, in which said suspension beam is a top mount beam; and in which each of said axle mounting plate openings is located adjacent to a respective one of an upper front and an upper rear quadrant of said axle.

26. The method of assembling a vehicle axle/suspension system of claim 25, in which said suspension beam is a rigid beam; in which a first cutout is formed in said axle mounting plate for accessing said upper front axle quadrant opening for securing the axle mounting plate to said axle; in which a first end of the beam is pivotally attached to said vehicle frame and a second end of said beam is attached to an air spring through an end plate attached to said beam second end; in which said end plate supports said air spring which extends between said end plate and the vehicle frame; and in which a second cutout is formed in said end plate for accessing said upper rear axle quadrant opening for securing said axle mounting plate to the axle.

27. The method of assembling a vehicle axle/suspension system of claim 26, in which a generally U-shaped rib is attached to and depends from said end plate and said axle mounting plate for supporting the end plate.

28. The method of assembling a vehicle axle/suspension system of claim 26, in which said rigid suspension beam includes an inverted U-shaped top channel; in which said top channel includes a pair of spaced-apart sidewalls and a top wall; in which an inverted U-shaped insert having a generally complementary size and shape to the top channel is disposed within said top channel adjacent to said axle mounting plate recess; in which said insert includes a pair of spaced-apart sidewalls and a top wall; and in which each of said insert sidewalls is attached to a respective one of said beam top channel sidewalls and said axle mounting plate with a single weld.

29. The method of assembling a vehicle axle/suspension system of claim 28, in which said axle mounting plate is formed with flanges which extend outboardly and inboardly beyond said top channel sidewalls adjacent to said axle mounting plate recess; and in which a press force is applied to said axle mounting plate flanges sufficient to extrude said axle into the mounting plate recess.

30. The method of assembling a vehicle axle/suspension system of claim 27, in which said suspension beam is a spring beam; in which said axle mounting plate includes a front end and a rear end; in which the axle mounting plate is attached to and depends from said spring beam; in which a first cutout is formed in said axle mounting plate front end for accessing said upper front axle quadrant opening for securing said axle mounting plate to said axle; in which a second cutout is formed in the axle mounting plate rear end for accessing said upper rear axle quadrant opening for securing the axle mounting plate to the axle; in which a first end of said beam is pivotally attached to said vehicle frame and a second end of said beam is attached to an air spring; and in which said air spring extends between said beam second end and the vehicle frame.

31. The method of assembling a vehicle axle/suspension system of claim 30, in which said axle mounting plate includes a pair of transversely spaced-apart, front to rear extending gussets.

32. The method of assembling a vehicle axle/suspension system of claim 24, in which said suspension beam is a bottom mount beam; and in which each of said axle mounting plate openings is located adjacent to a respective one of a lower front and a lower rear quadrant of said axle.

33. The method of assembling a vehicle axle/suspension system of claim 32, in which said suspension beam is a rigid beam; in which a first cutout is formed in said beam for accessing said lower front axle quadrant opening for securing the axle mounting plate to said axle; in which a first end of the beam is pivotally attached to said vehicle frame and a second end of said beam is attached to an air spring; in which said air spring extends between said beam second end and the vehicle frame; and in which a second cutout is formed in the beam rearwardly of said first cutout for accessing said lower rear axle quadrant opening for securing said axle mounting plate to the axle.

34. The method of assembling a vehicle axle/suspension system of claim 33, in which the rigid suspension beam includes a U-shaped bottom channel; and in which said bottom channel includes a pair of spaced-apart sidewalls and a bottom wall.

35. The method of assembling a vehicle axle/suspension system of claim 34, in which said axle mounting plate is formed with flanges which extend outboardly and inboardly beyond said bottom channel sidewalls adjacent to said axle mounting plate recess; and in which a press force is applied to said axle mounting plate flanges sufficient to extrude said axle into the mounting plate recess.

36. The method of assembling a vehicle axle/suspension system of claim 32, in which said suspension beam is a spring beam; in which said axle mounting plate includes a front end and a rear end; in which the axle mounting plate is attached to and extends upwardly from said beam; in which a first cutout is formed in said axle mounting plate front end for accessing said lower front axle quadrant opening for securing said axle mounting plate to said axle; in which a second cutout is formed in said axle mounting plate rear end for accessing said lower rear axle quadrant opening for securing the axle mounting plate to the axle; in which a first end of the beam is pivotally attached to the vehicle frame and a second end of said beam is attached to an air spring; and in which said air spring extends between said beam second end and the vehicle frame.

37. The method of assembling a vehicle axle/suspension system of claim 36, in which the axle mounting plate includes a pair of transversely spaced-apart, front to rear extending gussets.

38. The method of assembling a vehicle axle/suspension system of claim 21, in which the cross-sectional shape of said axle adjacent to said suspension beam is deformed such that it has a different shape than an original cross-sectional shape of said axle prior to mounting said axle on said axle mounting plate.

39. The method of assembling a vehicle axle/suspension system of claim 21, in which said axle is secured directly to said axle mounting plate without the use of additional parts and structure.

40. The method of assembling a vehicle axle/suspension system of claim 21, in which said axle is mounted in a pair of spaced-apart suspension beams.

41. A vehicle axle/suspension assembly, said assembly including:
  at least one rigid top mount suspension beam mounted on a frame of a vehicle, said suspension beam comprising:
    i) a compressive axle mounting plate formed with a recess, said recess having a shape generally complementary to and surrounding about half of the periphery of an axle, said axle mounting plate having a pair of edges defining the outermost limit of the recess, said recess being a smaller size or an equal size to said surrounded axle periphery prior to mounting said axle on said; axle mounting plate, said axle mounting plate being formed with a pair of openings, said openings each being circumferentially offset from a vertical axis plane of said axle and located adjacent to a respective one of an upper front and an upper rear quadrant of said axle, a first cutout being formed in said axle mounting plate for accessing said upper front axle quadrant opening, a first end of said beam being pivotally attached to said vehicle frame and a second end of said beam being attached to an air spring through an end plate attached to said beam second end, said end plate supporting said air spring extending between said end plate and the vehicle frame, a second cutout being formed in the end plate for accessing said upper rear axle quadrant opening for securing said axle mounting plate to the axle, and upon mounting the axle on the axle mounting plate, at least a portion of an interface between said surrounded axle periphery and said axle mounting plate is in continuous compressive contact; and
    ii) a continuous weld being disposed in each of said axle mounting plate openings about a periphery of said openings for securing said axle mounting plate to said axle.

42. A vehicle axle/suspension assembly, said assembly including:
  at least one rigid top mount suspension beam mounted on a frame of a vehicle, said suspension beam comprising:
    i) a compressive axle mounting plate formed with a recess, said recess having a shape generally complementary to and surrounding about half of the periphery of an axle, said axle mounting plate having a pair of edges defining the outermost limit of the recess, said recess being a smaller size or an equal size to said surrounded axle periphery prior to mounting said axle on said axle mounting plate, said axle mounting plate being formed with a pair of openings, said openings each being circumferentially offset from a vertical axis plane of said axle and located adjacent to a respective one of an upper front and an upper rear quadrant of said axle, a first cutout being formed in said axle mounting plate for accessing said upper front axle quadrant opening, a first end of said beam being pivotally attached to said vehicle frame and a second end of said beam being attached to an air spring through an end plate attached to said beam second end, said end plate supporting said air spring extending between said end plate and the vehicle frame, a second cutout being formed in the end plate for accessing said upper rear axle quadrant opening for securing said axle mounting plate to the axle, a generally U-shaped rib being attached to and depending from said end plate and said axle mounting plate for supporting said end plate, and upon mounting the axle on the axle mounting plate, at least a portion of an interface between said surrounded axle periphery and said axle mounting plate is in continuous compressive contact; and
    ii) a continuous weld being disposed in each of said axle mounting plate openings about a periphery of said openings for securing said axle mounting plate to said axle.

43. A vehicle axle/suspension assembly, said assembly including:
  at least one rigid top mount suspension beam mounted on a frame of a vehicle, said beam including an inverted U-shaped top channel, said top channel including a pair of spaced-apart sidewalls and a top wall, an inverted U-shaped insert having a generally complementary size and shape to said top channel being disposed within the top channel adjacent to an axle mounting plate recess, said insert including a pair of spaced-apart insert sidewalls and a top wall, and said insert sidewalls each being attached to a respective one of said top channel sidewalls and a compressive axle mounting plate with a single weld, said suspension beam comprising:
    i) said compressive axle mounting plate formed with said recess, said recess having a shape generally complementary to and surrounding about half of the periphery of an axle, said axle mounting plate having a pair of edges defining the outermost limit of the recess, said recess being a smaller size or an equal size to said surrounded axle periphery prior to mounting said axle on said axle mounting plate, said axle mounting plate being formed with a pair of openings, said openings each being circumferentially offset from a vertical axis plane of said axle and located adjacent to a respective one of an upper front and an upper rear quadrant of said axle, a first cutout being formed in said axle mounting plate for accessing said upper front axle quadrant opening, a first end of said beam being pivotally attached to said vehicle frame and a second end of said beam being attached to an air spring through an end plate attached to said beam second end, said end plate supporting said air spring extending between said end plate and the vehicle frame, a second cutout being formed in the end plate for accessing said upper rear axle quadrant opening for securing said axle mounting plate to the axle, a generally U-shaped rib being attached to and depending from said end plate and said axle mounting plate for supporting said end plate, and upon mounting the axle on the axle mounting plate, at least a portion of an interface between said surrounded axle periphery and said axle mounting plate is in continuous compressive contact; and ii) a continuous weld being disposed in each of said axle mounting plate openings about a periphery of said openings for securing said axle mounting plate to said axle.

44. A vehicle axle/suspension assembly, said assembly including:

at least one rigid top mount suspension beam mounted on a frame of a vehicle, said beam including an inverted U-shaped top channel, said top channel including a pair of spaced-apart sidewalls and a top wall, an inverted U-shaped insert having a generally complementary size and shape to said top channel being disposed within the top channel adjacent to an axle mounting plate recess, said insert including a pair of spaced-apart sidewalls and a top wall, and said insert sidewalls each being attached to a respective one of said top channel sidewalls and a compressive axle mounting plate with a single weld, said suspension beam comprising:

i) said compressive axle mounting plate formed with said recess, said recess having a shape generally complementary to and surrounding about half of the periphery of an axle, said axle mounting plate having a pair of edges defining the outermost limit of the recess, said recess being a smaller size or an equal size to said surrounded axle periphery prior to mounting said axle on said axle mounting plate, said axle mounting plate being formed with a pair of openings, said openings each being circumferentially offset from a vertical axis plane of said axle and located adjacent to a respective one of an upper front and an upper rear quadrant of said axle, a first cutout being formed in said axle mounting plate for accessing said upper front axle quadrant opening, a first end of said beam being pivotally attached to said vehicle frame and a second end of said beam being attached to an air spring through an end plate attached to said beam second end, said end plate supporting said air spring extending between said end plate and the vehicle frame, a second cutout being formed in the end plate for accessing said upper rear axle quadrant opening for securing said axle mounting plate to the axle, a generally U-shaped rib being attached to and depending from said end plate and said axle mounting plate for supporting said end plate, said axle mounting plate extending outboardly and inboardly beyond said top channel sidewalls adjacent to said axle mounting plate recess to provide a force bearing surface for extruding the axle into the mounting plate recess, and upon mounting the axle on the axle mounting plate, at least a portion of an interface between said surrounded axle periphery and said axle mounting plate is in continuous compressive contact; and ii) a continuous weld being disposed in each of said axle mounting plate openings about a periphery of said openings for securing said axle mounting plate to said axle.

45. A method of assembling a vehicle axle/suspension system, said method including the steps of:

a) preassembling at least one rigid top mount suspension beam, including a compressive axle mounting plate formed with a recess, said recess having a shape generally complementary to generally half of the periphery of an axle for surrounding said axle half periphery, said axle mounting plate having a pair of edges defining the outermost limit of the recess, said recess being a smaller size or an equal size to the axle half periphery, said axle mounting plate being formed with a pair of openings, said openings each being circumferentially offset from a vertical axis plane of said axle and located adjacent to a respective one of an upper front and an upper rear quadrant of said axle, a first cutout being formed in said axle mounting plate for accessing said upper front axle quadrant opening, a first end of said beam being pivotally attached to a vehicle frame and a second end of said beam being attached to an air spring through an end plate attached to said beam second end, said end plate supporting said air spring extending between said end plate and the vehicle frame, a second cutout being formed in the end plate for accessing said upper rear axle quadrant opening for securing said axle mounting plate to the axle;

b) extruding said axle half periphery into the recess so that at least a portion of an interface between said axle half periphery and said axle mounting plate is in continuous compressive contact;

c) disposing a continuous weld in each of said axle mounting plate openings about a periphery of said openings for securing the axle to said axle mounting plate; and d) mounting said suspension beam and said axle on said vehicle frame.

46. A method of assembling a vehicle axle/suspension system, said method including the steps of:

a) preassembling at least one rigid top mount suspension beam, including a compressive axle mounting plate formed with a recess, said recess having a shape generally complementary to generally half of the periphery of an axle for surrounding said axle half periphery, said axle mounting plate having a pair of edges defining the outermost limit of the recess, said recess being a smaller size or an equal size to the axle half periphery, said axle mounting plate being formed with a pair of openings, said openings each being circumferentially offset from a vertical axis plane of said axle and located adjacent to a respective one of an upper front and an upper rear quadrant of said axle, a first cutout being formed in said axle mounting plate for accessing said upper front axle quadrant opening, a first end of said beam being pivotally attached to a vehicle frame and a second end of said beam being attached to an air spring through an end plate attached to said beam second end, said end plate supporting said air spring extending between said end plate and the vehicle frame, a second cutout being formed in the end plate for accessing said upper rear axle quadrant opening for securing said axle mounting plate to the axle, and a generally U-shaped rib being attached to and depending from said end plate and said axle mounting plate for supporting said end plate;

b) extruding said axle half periphery into the recess so that at least a portion of an interface between said axle half periphery and said axle mounting plate is in continuous compressive contact;

c) disposing a continuous weld in each of said axle mounting plate openings about a periphery of said openings for securing the axle to said axle mounting plate; and d) mounting said suspension beam and said axle on said vehicle frame.

47. A method of assembling a vehicle axle/suspension system, said method including the steps of:

a) preassembling at least one rigid top mount suspension beam, said beam including an inverted U-shaped top channel, said top channel including a pair of spaced-apart sidewalls and a top wall, an inverted U-shaped insert having a generally complementary size and shape to said top channel being disposed within the top channel adjacent to an axle mounting plate recess, said insert including a pair of spaced-apart sidewalls and a top wall, and said insert sidewalls each being attached to a respective one of said top channel sidewalls and a copressive axle mounting plate with a single weld, said beam including said compressive axle mounting plate formed with said recess, said recess having a shape generally complementary to generally half of the periphery of an axle for surrounding said axle half periphery, said axle mounting plate having a pair of edges defining the outermost limit of the recess, said recess being a smaller size or an equal size to the axle half periphery, said axle mounting plate being formed with a pair of openings, said openings each being circumferentially offset from a vertical axis plane of said axle and located adjacent to a respective one of an upper front and an upper rear quadrant of said axle, a first cutout being formed in said axle mounting plate for accessing said upper front axle quadrant opening, a first end of said beam being pivotally attached to a vehicle frame and a second end of said beam being attached to an air spring through an end plate attached to said beam second end, said end plate supporting said air spring extending between said end plate and the vehicle frame, a second cutout being formed in the end plate for accessing said upper rear axle quadrant opening for securing said axle mounting plate to the axle, and a generally U-shaped rib being attached to and depending from said end plate and said axle mounting plate for supporting said end plate;

b) extruding said axle half periphery into the recess so that at least a portion of an interface between said axle half periphery and said axle mounting plate is in continuous compressive contact;

c) disposing a continuous weld in each of said axle mounting plate openings about a periphery of said openings for securing the axle to said axle mounting plate; and d) mounting said suspension beam and said axle on said vehicle frame.

48. A method of assembling a vehicle axle/suspension system, said method including the steps of:

a) preassembling at least one rigid top mount suspension beam, said beam including an inverted U-shaped top channel, said top channel including a pair of spaced-apart sidewalls and a top wall, an inverted U-shaped insert having a generally complementary size and shape to said top channel being disposed within the top channel adjacent to an axle mounting plate recess, said insert including a pair of spaced-apart sidewalls and a top wall, and said insert sidewalls each being attached to a respective one of said top channel sidewalls and a compressive axle mounting plate with a single weld, said beam including said compressive axle mounting plate formed with said recess, said recess having a shape generally complementary to generally half of the periphery of an axle for surrounding said axle half periphery, said axle mounting plate having a pair of edges defining the outermost limit of the recess, said recess being a smaller size or an equal size to the axle half periphery, said axle mounting plate being formed with a pair of openings, said openings each being circumferentially offset from a vertical axis plane of said axle and located adjacent to a respective one of an upper front and an upper rear quadrant of said axle, a first cutout being formed in said axle mounting plate for accessing said upper front axle quadrant opening, a first end of said beam being pivotally attached to a vehicle frame and a second end of said beam being attached to an air spring through an end plate attached to said beam second end, said end plate supporting said air spring extending between said end plate and the vehicle frame, a second cutout being formed in the end plate for accessing said upper rear axle quadrant opening for securing said axle mounting plate to the axle, a generally U-shaped rib being attached to and depending from said end plate and said axle mounting plate for supporting said end plate, said axle mounting plate extending outboardly and inboardly beyond said top channel sidewalls adjacent to said axle mounting plate recess to provide a force bearing surface for extruding the axle into the mounting plate recess;

b) extruding said axle half periphery into the recess so that at least a portion of an interface between said axle half periphery and said axle mounting plate is in continuous compressive contact;

c) disposing a continuous weld in each of said axle mounting plate openings about a periphery of said openings for securing the axle to said axle mounting plate; and d) mounting said suspension beam and said axle on said vehicle frame.

* * * * *